United States Patent
Hong et al.

(10) Patent No.: US 11,455,815 B2
(45) Date of Patent: Sep. 27, 2022

(54) TOUCH-FINGERPRINT COMPLEX SENSOR AND ELECTRONIC APPARATUS INCLUDING THE SAME

(71) Applicant: SAMSUNG ELECTRONICS CO., LTD., Suwon-si (KR)

(72) Inventors: Seogwoo Hong, Yongin-si (KR); Jinmyoung Kim, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 272 days.

(21) Appl. No.: 16/398,543

(22) Filed: Apr. 30, 2019

(65) Prior Publication Data
US 2020/0050815 A1    Feb. 13, 2020

(30) Foreign Application Priority Data
Aug. 10, 2018    (KR) .................. 10-2018-0093991

(51) Int. Cl.
G06V 40/13    (2022.01)
G06F 3/044    (2006.01)
G06F 3/041    (2006.01)

(52) U.S. Cl.
CPC ........ *G06V 40/1306* (2022.01); *G06F 3/0412* (2013.01); *G06F 3/0416* (2013.01); *G06F 3/0443* (2019.05); *G06F 3/0446* (2019.05)

(58) Field of Classification Search
None
See application file for complete search history.

(56) References Cited

U.S. PATENT DOCUMENTS 7,030,860 B1    4/2006    Hsu et al.
8,564,314 B2    10/2013   Shaikh et al.
(Continued)

FOREIGN PATENT DOCUMENTS

CN    108268161 A    7/2018
KR    10-1432988 B1    8/2014
(Continued)

OTHER PUBLICATIONS

Communication dated Oct. 25, 2019, issued by the European Patent Office in counterpart European Application No. 19164406.1.

*Primary Examiner* — Amare Mengistu
*Assistant Examiner* — Sarvesh J Nadkarni
(74) *Attorney, Agent, or Firm* — Sughrue Mion, PLLC

(57) ABSTRACT

A touch-fingerprint complex sensor is provided for detecting a touch and a fingerprint of a user, using a touch pad including a touch region and a fingerprint recognizing region. The touch-fingerprint complex sensor includes a plurality of first electrodes disposed on a substrate, and arranged in parallel in a first direction, a plurality of second electrodes disposed on the substrate, and arranged in parallel in a second direction crossing the first direction, and an insulating layer disposed between the plurality of first electrodes and the plurality of second electrodes. A cross-sectional distance between the plurality of first electrodes and the plurality of second electrodes at intersections of the plurality of first electrodes and the plurality of second electrodes in the touch region excluding the fingerprint recognizing region is greater than that at intersections of the plurality of first electrodes and the plurality of second electrodes in the fingerprint recognizing region.

30 Claims, 28 Drawing Sheets

(56) References Cited

U.S. PATENT DOCUMENTS

| | | |
|---|---|---|
| 8,599,150 B2 | 12/2013 | Philipp |
| 8,724,038 B2 | 5/2014 | Ganapathi et al. |
| 8,867,799 B2 | 10/2014 | Benkley, III |
| 9,058,511 B2 | 6/2015 | Chou |
| 9,141,239 B2 | 9/2015 | Yun et al. |
| 9,990,081 B2 | 6/2018 | Kim |
| 10,176,358 B2 | 1/2019 | Han et al. |
| 2012/0250949 A1 | 10/2012 | Abiko |
| 2014/0140588 A1* | 5/2014 | Chou .................. G06K 9/0002 382/124 |
| 2017/0031514 A1* | 2/2017 | Kimura ................ G06F 3/0443 |
| 2017/0123566 A1* | 5/2017 | Noguchi ........... G06F 3/041661 |
| 2017/0193265 A1* | 7/2017 | Chan .................... G06F 3/0446 |
| 2017/0220182 A1* | 8/2017 | Schwartz ............ G06F 3/04164 |
| 2017/0308228 A1 | 10/2017 | Benkley, III et al. |
| 2017/0316249 A1 | 11/2017 | Lee et al. |
| 2017/0336906 A1 | 11/2017 | Yoon et al. |
| 2017/0336909 A1 | 11/2017 | Song et al. |
| 2017/0344148 A1* | 11/2017 | Han .................... G06F 3/04886 |
| 2018/0011601 A1* | 1/2018 | Kurasawa ........... G06F 3/04166 |
| 2018/0059856 A1 | 3/2018 | Kim et al. |
| 2018/0060636 A1 | 3/2018 | Hong et al. |
| 2018/0165494 A1 | 6/2018 | Kim |
| 2019/0041917 A1 | 2/2019 | Chung |
| 2019/0042035 A1 | 2/2019 | Kim |
| 2019/0286264 A1* | 9/2019 | Li ........................ G06K 9/0002 |
| 2020/0019744 A1 | 1/2020 | Kim |

FOREIGN PATENT DOCUMENTS

| | | |
|---|---|---|
| KR | 10-2016-0141180 A | 12/2016 |
| KR | 10-1761547 B1 | 7/2017 |
| KR | 10-2017-0124025 A | 11/2017 |
| KR | 10-2017-0129476 A | 11/2017 |
| KR | 10-2018-0022391 A | 3/2018 |
| KR | 10-2018-0024500 A | 3/2018 |
| KR | 10-2018-0067226 A | 6/2018 |

* cited by examiner

TOUCH-FINGERPRINT COMPLEX SENSOR AND ELECTRONIC APPARATUS INCLUDING THE SAME

CROSS-REFERENCE TO RELATED APPLICATION

This application claims priority from Korean Patent Application No. 10-2018-0093991, filed on Aug. 10, 2018, in the Korean Intellectual Property Office, the disclosure of which is incorporated herein by reference in its entirety.

BACKGROUND

1. Field

Apparatuses and methods consistent with example embodiments relate to touch-fingerprint complex sensors and electronic apparatuses including the touch-fingerprint complex sensors.

2. Description of the Related Art

A touch screen is an input device that, when a user touches or presses a screen with a finger or the like, recognizes a touch position or related information and transmits the information to a system. The touch screen is simple and easy to use. A capacitive touch screen has high transmittance, excellent durability, superior touch resolution, and multi-touch capability. A touch screen panel is applied not only to mobile devices such as smart phones and tablet personal computers (PCs), but also to a wide variety of electronic devices such as automatic teller machines (ATMs), automatic ticket issuing machines, and navigation devices.

In recent years, the need for personal authentication during use of various mobile devices and electronic devices has been gradually expanded. Personal authentication based on personal features such as a fingerprint, voice, face, and iris can be used in mobile devices, entrance/access control devices, financial devices, etc. Fingerprint recognition technologies for smart phones and tablet PCs according to methods of the related art operate on a fingerprint recognition module that is separate from the touch screen module.

SUMMARY

Example embodiments provide touch-fingerprint complex sensors capable of sensing both a touch and a fingerprint and having improved sensing performance. Also, provided are touch-fingerprint complex sensors advantageous in enlargement and high-speed driving, and capable of improving visibility characteristics.

Further, example embodiments provide touch-fingerprint complex sensors capable of increasing a sensing depth of fingerprint recognition.

Further still, example embodiments provide electronic apparatuses including the touch-fingerprint complex sensors.

Additional aspects will be set forth in part in the description which follows and, in part, will be apparent from the description, or may be learned by practice of the presented embodiments.

According to an aspect of an example embodiment, there is provided a touch-fingerprint complex sensor for detecting a touch and a fingerprint of a user, using a touch pad including a touch region in which the touch is detected and a fingerprint recognizing region in which the fingerprint is detected, the touch-fingerprint complex sensor including a plurality of first electrodes disposed on a substrate, and arranged in parallel in a first direction, a plurality of second electrodes disposed on the substrate, and arranged in parallel in a second direction crossing the first direction, and an insulating layer disposed between the plurality of first electrodes and the plurality of second electrodes. A cross-sectional distance between the plurality of first electrodes and the plurality of second electrodes at intersections of the plurality of first electrodes and the plurality of second electrodes in the touch region excluding the fingerprint recognizing region is greater than a cross-sectional distance between the plurality of first electrodes and the plurality of second electrodes at intersections of the plurality of first electrodes and the plurality of second electrodes in the fingerprint recognizing region.

A height difference between the plurality of first electrodes and the plurality of second electrodes at the intersections in the touch region excluding the fingerprint recognizing region may be greater than a height difference between the plurality of first electrodes and the plurality of second electrodes at non-intersections around the intersections in the touch region.

A height difference between the plurality of first electrodes and the plurality of second electrodes at non-intersections around the intersections in the touch region excluding the fingerprint recognizing region may be substantially same as a height difference between the plurality of first electrodes and the plurality of second electrodes at the intersections in the fingerprint recognizing region.

A mutual capacitance at the intersections in the touch region excluding the fingerprint recognizing region may be less than a mutual capacitance at the intersections in the fingerprint recognizing region.

The touch-fingerprint complex sensor further includes a step adjusting layer provided separately from the substrate or provided as a part of the substrate. The cross-sectional distance between the plurality of first electrodes and the plurality of second electrodes at the intersections in the touch region excluding the fingerprint recognizing region may be greater than the cross-sectional distance between the plurality of first electrodes and the plurality of second electrodes at the intersections in the fingerprint recognizing region, based on a shape and a dimension of the step adjusting layer.

The step adjusting layer may include a plurality of via holes, and the plurality of via holes may be disposed at locations corresponding to the intersections in the touch region excluding the fingerprint recognizing region.

Each of the plurality of via holes may have a diameter or a width less than or equal to 100 μm.

The step adjusting layer may be provided separately from the substrate, and disposed on the substrate, the plurality of first electrodes may be disposed on the substrate and the step adjusting layer, the insulating layer may cover the step adjusting layer and the plurality of first electrodes, and the plurality of second electrodes may be disposed on the insulating layer.

The step adjusting layer may include a plurality of island pattern layers, and the plurality of island pattern layers may be disposed at locations corresponding to the intersections in the touch region excluding the fingerprint recognizing region.

The plurality of first electrodes and first parts of the plurality of second electrodes may be disposed on a first level, and second parts of the plurality of second electrodes may be disposed on a second level different from the first level.

The plurality of first electrodes and first parts of the plurality of second electrodes may be disposed on the substrate, the insulating layer may be disposed on the substrate, the plurality of first electrodes, and the first parts of the plurality of second electrodes, and includes a plurality of openings respectively exposing portions of the first parts of the plurality of second electrodes, the step adjusting layer may be disposed on a portion of the insulating layer in the touch region excluding the fingerprint recognizing region, second parts of the plurality of second electrodes may be disposed on the insulating layer and the step adjusting layer, and each of the second parts of the plurality of second electrodes may extend in the second direction and have a bridge structure of connecting the first parts of the plurality of second electrodes by being respectively connected to the first parts of the plurality of second electrodes through the plurality of openings.

One of the plurality of openings may be provided for each of the first parts of the plurality of second electrodes.

Two of the plurality of openings may be provided for each of the first parts of the plurality of second electrodes, and a center portion of a respective one of the first parts of the plurality of second electrodes may be disposed between each two of the plurality of openings.

The insulating layer may include an organic material.

Each of the plurality of first electrodes and the plurality of second electrodes may include a plurality of rhombus shape pattern portions and a connecting portion disposed between the plurality of rhombus shape pattern portions.

One of the plurality of first electrodes and the plurality of second electrodes may include a plurality of rhombus shape pattern portions and a connecting portion disposed between the plurality of rhombus shape pattern portions, and another one of the plurality of first electrodes and the plurality of second electrodes may include a plurality of electrode lines, or each of the plurality of first electrodes and the plurality of second electrodes may include the plurality of electrode lines.

The plurality of first electrodes may include a plurality of first touch electrodes and a plurality of first sub-electrodes disposed between the plurality of first touch electrodes, the plurality of second electrodes may include a plurality of second touch electrodes and a plurality of second sub-electrodes disposed between the plurality of second touch electrodes, and each of the plurality of first touch electrodes and the plurality of second touch electrodes may be regularly arranged.

At least two of the plurality of first touch electrodes may be electrically-grouped as a first unit group, and at least two of the plurality of second touch electrodes may be electrically-grouped as a second unit group.

The touch pad may have a two-electrode structure.

The plurality of first electrodes and the plurality of second electrodes may be disposed on one surface of the substrate.

An electronic apparatus may include the touch-fingerprint complex sensor.

According to an aspect of an example embodiment, there is provided a touch-fingerprint complex sensor for detecting a touch and a fingerprint of a user, using a touch pad including a touch region in which the touch is detected and a fingerprint recognizing region in which the fingerprint is detected, the touch-fingerprint complex sensor including a plurality of first electrodes disposed on a substrate, and arranged in parallel in a first direction, a plurality of second electrodes disposed on the substrate, and arranged in parallel in a second direction crossing the first direction, an insulating layer disposed between the plurality of first electrodes and the plurality of second electrodes, and a step adjusting layer disposed adjacent to the insulating layer. A mutual capacitance at intersections of the plurality of first electrodes and the plurality of second electrodes in the fingerprint recognizing region and a mutual capacitance at intersections of the plurality of first electrodes and the plurality of second electrodes in the touch region excluding the fingerprint recognizing region are different based on the step adjusting layer.

The mutual capacitance at the intersections in the touch region excluding the fingerprint recognizing region may be less than the mutual capacitance at the intersections in the fingerprint recognizing region.

A cross-sectional distance between the plurality of first electrodes and the plurality of second electrodes at the intersections in the touch region excluding the fingerprint recognizing region may be greater than a cross-sectional distance between the plurality of first electrodes and the plurality of second electrodes at the intersections in the fingerprint recognizing region.

A height difference between the plurality of first electrodes and the plurality of second electrodes at the intersections in the touch region excluding the fingerprint recognizing region may be greater than a height difference between the plurality of first electrodes and the plurality of second electrodes at non-intersections around the intersections in the touch region.

A height difference between the plurality of first electrodes and the plurality of second electrodes at non-intersections around the intersections in the touch region excluding the fingerprint recognizing region may be substantially same as a height difference between the plurality of first electrodes and the plurality of second electrodes at the intersections in the fingerprint recognizing region.

The step adjusting layer may include a plurality of via holes, and the plurality of via holes may be disposed at locations corresponding to the intersections in the touch region excluding the fingerprint recognizing region.

The step adjusting layer may include a plurality of island pattern layers, and the plurality of island pattern layers may be disposed at locations corresponding to the intersections in the touch region excluding the fingerprint recognizing region.

The plurality of first electrodes and first parts of the plurality of second electrodes may be disposed on a first level, and second parts of the plurality of second electrodes may be disposed on a second level different from the first level.

An electronic apparatus may include the touch-fingerprint complex sensor.

According to an aspect of an example embodiment, there is provided a method of manufacturing a touch-fingerprint complex sensor for detecting a touch and a fingerprint of a user, using a touch pad including a touch region in which the touch is detected and a fingerprint recognizing region in which the fingerprint is detected, the method including forming a step adjusting layer on a substrate, forming a plurality of via holes through the step adjusting layer, forming a plurality of first electrodes arranged in parallel in a first direction. The plurality of first electrodes in the touch region excluding the fingerprint recognizing region is formed in the plurality of via holes and on the substrate, and the plurality of first electrodes in the fingerprint recognizing region is formed on the step adjusting layer. The method further includes forming an insulating layer on the plurality of first electrodes, the step adjusting layer and the substrate, and forming, on the substrate, a plurality of second electrodes arranged in parallel in a second direction crossing the first direction. A cross-sectional distance between the plurality of first electrodes and the plurality of second electrodes at intersections of the plurality of first electrodes and the plurality of second electrodes in the touch region excluding the fingerprint recognizing region is greater than a cross-sectional distance between the plurality of first electrodes and the plurality of second electrodes at intersections of the plurality of first electrodes and the plurality of second electrodes in the fingerprint recognizing region.

The plurality of via holes may be formed at locations corresponding to the intersections in the touch region excluding the fingerprint recognizing region.

According to an aspect of an example embodiment, there is provided a method of manufacturing a touch-fingerprint complex sensor for detecting a touch and a fingerprint of a user, using a touch pad including a touch region in which the touch is detected and a fingerprint recognizing region in which the fingerprint is detected, the method including forming, on a substrate, a plurality of first electrodes arranged in parallel in a first direction, forming, on the substrate, first parts of a plurality of second electrodes arranged in parallel in a second direction crossing the first direction, forming an insulating layer on the plurality of first electrodes and the first parts of the plurality of second electrodes, forming, through the insulating layer, a plurality of openings respectively exposing portions of the first parts of the plurality of second electrodes, forming a step adjusting layer on a portion of the insulating layer in the touch region excluding the fingerprint recognizing region, and forming second parts of the plurality of second electrodes on the step adjusting layer and the insulating layer and through the plurality of openings to the first parts of the plurality of first electrodes. A cross-sectional distance between the plurality of first electrodes and the plurality of second electrodes at intersections of the plurality of first electrodes and the plurality of second electrodes in the touch region excluding the fingerprint recognizing region is greater than a cross-sectional distance between the plurality of first electrodes and the plurality of second electrodes at intersections of the plurality of first electrodes and the plurality of second electrodes in the fingerprint recognizing region.

The step adjusting layer may include a plurality of island pattern layers, and the plurality of island pattern layers may be formed at locations corresponding to the intersections in the touch region excluding the fingerprint recognizing region.

BRIEF DESCRIPTION OF THE DRAWINGS

The above and/or other aspects will become apparent and more readily appreciated from the following description of example embodiments, taken in conjunction with the accompanying drawings in which.

DETAILED DESCRIPTION

Figure 1:
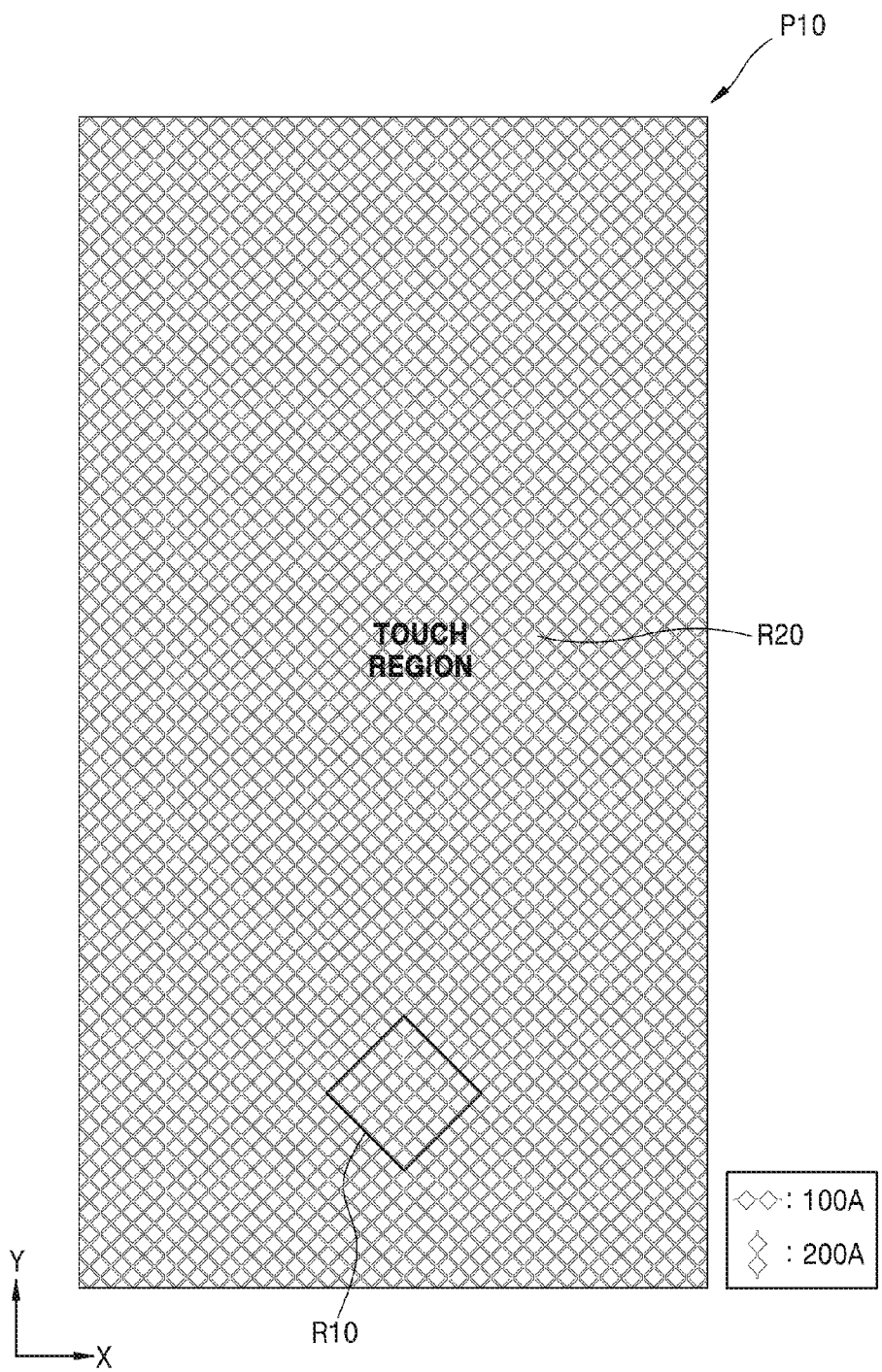
FIG. 1 is a plan view of a touch-fingerprint complex sensor according to an example embodiment.

Various example embodiments will now be described more fully with reference to the accompanying drawings in which example embodiments are shown.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items.

It will be understood that, although the terms "first," "second," etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing embodiments only and is not intended to be limiting of example embodiments. As used herein, the singular forms "a," "an" and "the" are intended to include the plural forms as well, unless the context clearly indicates otherwise. It will be further understood that the terms "comprises," "includes," "comprising," and/or "including," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing. For example, an implanted region illustrated as a rectangle may have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, may be interpreted as having a meaning that is consistent with their meaning in the context of the relevant art and will not be interpreted in an idealized or overly formal sense unless expressly so defined herein.

Hereinafter, touch-fingerprint complex sensors and electronic apparatuses including the touch-fingerprint complex sensors, according to embodiments, will be described with reference to accompanying drawings. Widths or thickness of layers or regions in drawings may be exaggerated for clarity and convenience of description. Throughout the specification, like reference numerals denote like elements.

FIG. 1 is a plan view of a touch-fingerprint complex sensor according to an embodiment.

Referring to FIG. 1, a touch pad P10 including a fingerprint recognizing region R10 may be provided. The touch pad P10 includes a touch region R20 that is not the fingerprint recognizing region R10. In a fingerprint recognizing mode, a fingerprint of a user is recognized via the fingerprint recognizing region R10, and in a touch detecting mode, a touch of the user may be detected via the touch region R20 and the fingerprint recognizing region R10. In other words, in the touch detecting mode, the fingerprint recognizing region R10 may also be used as a touch region.

The touch pad P10 includes a plurality of first electrodes 100A arranged in parallel in a first direction, for example, an X-axis direction, and a plurality of second electrodes 200A arranged in parallel in a second direction, for example, a Y-axis direction, crossing the plurality of first electrodes 100A. The plurality of first electrodes 100A and the plurality of second electrodes 200A may be perpendicular to each other. An insulating layer may be provided between the plurality of first electrodes 100A and the plurality of second electrodes 200A. In other words, the plurality of first electrodes 10A and the plurality of second electrodes 200A may be spaced apart from each other with an insulating layer therebetween. The plurality of second electrodes 200A may be located above the plurality of first electrodes 100A or vice versa. The plurality of first electrodes 100A may each be a driving electrode and the plurality of second electrodes 200A may each be a detecting electrode, or vice versa. The plurality of first electrodes 100A may be substantially arranged at regular intervals, and the plurality of second electrodes 200A may be substantially arranged at regular intervals. Mutual capacitance may be formed between the plurality of first electrodes 100A and the plurality of second electrodes 200A. Accordingly, the touch-fingerprint complex sensor may be a capacitance-type sensor.

According to the example embodiments, a distance (interval) between the first and second electrodes 100A and 200A at an intersection of the first and second electrodes 100A and 200A in the touch region R20 may be different from a distance (interval) between the first and second electrodes 100A and 200A at an intersection of the first and second electrodes 100A and 200A in the fingerprint recognizing region R10. The distance between the first and second electrodes 100A and 200A at the intersection of the first and second electrodes 100A and 200A in the touch region R20 may be greater than the distance between the first and second electrodes 100A and 200A at the intersection of the first and second electrodes 100A and 200A in the fingerprint recognizing region R10. In this regard, mutual capacitance (Cm) at the intersection of the first and second electrodes 100A and 200A in the touch region R20 may be different from mutual capacitance at the intersection of the first and second electrodes 100A and 200A in the fingerprint recognizing region R10. The mutual capacitance at the intersection of the first and second electrodes 100A and 200A in the touch region R20 may be less than the mutual capacitance at the intersection of the first and second electrodes 100A and 200A in the fingerprint recognizing region R10.

Figure 2A:
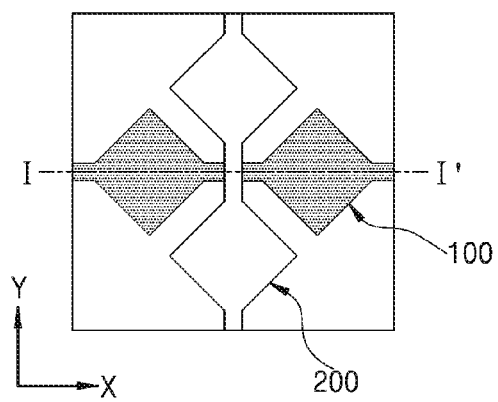
FIG. 2A is a plan view of a part of a fingerprint recognizing region of a touch-fingerprint complex sensor, according to an example embodiment.
Figure 2B:
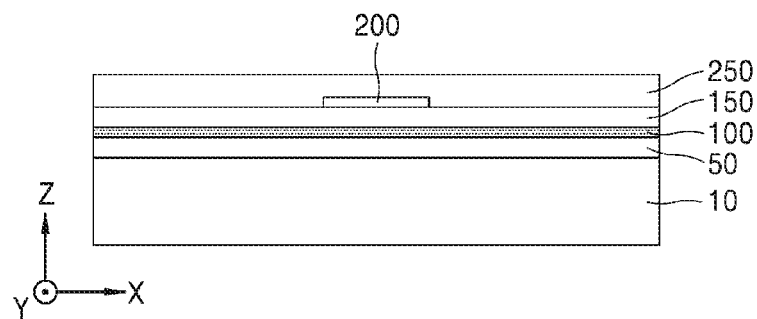
FIG. 2B is a cross-sectional view taken along a line I-I' of FIG. 2A.

FIG. 2A is a plan view of a part of a fingerprint recognizing region of a touch-fingerprint complex sensor, according to an example embodiment, and FIG. 2B is a cross-sectional view taken along a line I-I' of FIG. 2A.

Referring to FIGS. 2A and 2B, in the fingerprint recognizing region R10 of FIG. 1, a step adjusting layer 50 may be provided on a substrate 10, a first electrode 100 may be provided on the step adjusting layer 50, an insulating layer 150 covering the first electrode 100 may be provided, and a second electrode 200 may be provided on the insulating layer 150. The second electrode 200 may extend in a direction crossing the first electrode 100. A passivation layer 250 covering the second electrode 200 may be provided on the insulating layer 150.

Figure 3A:
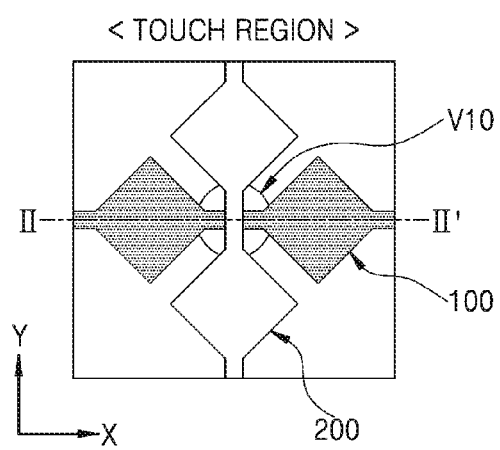
FIG. 3A is a plan view of a part of a touch region excluding a fingerprint recognizing region of a touch-fingerprint complex sensor, according to an example embodiment.
Figure 3B:
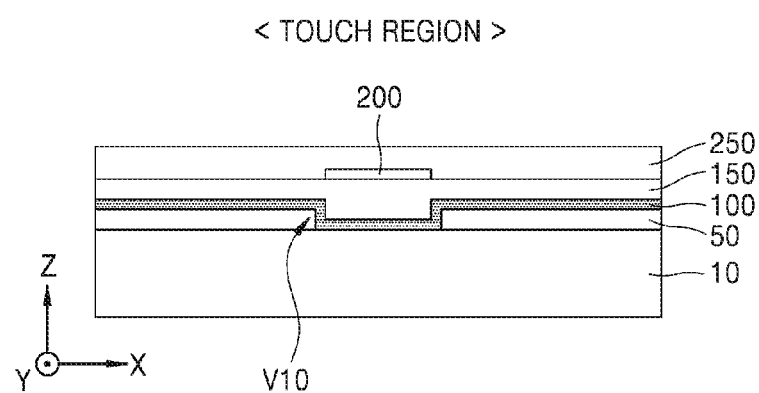
FIG. 3B is a cross-sectional view taken along a line II-II' of FIG. 3A.

FIG. 3A is a plan view of a part of a touch region excluding a fingerprint recognizing region of a touch-fingerprint complex sensor, according to example embodiments, and FIG. 3B is a cross-sectional view taken along a line II-II' of FIG. 3A.

Referring to FIGS. 3A and 3B, in the touch region R20 of FIG. 1 excluding the fingerprint recognizing region R10 of FIG. 1, the step adjusting layer 50 may be provided on the substrate 10, the first electrode 100 may be provided on the step adjusting layer 50, the insulating layer 150 covering the first electrode 100 may be provided, and the second electrode 200 may be provided on the insulating layer 150. A top surface of the insulating layer 150 may be flat or roughly flat. The step adjusting layer 50 may include a via hole V10 formed at a location corresponding to an intersection of the first and second electrodes 100 and 200. A portion of the first electrode 100 may be recessed by the via hole V10, and as a result, in the cross-sectional view, a distance (interval) between the first and second electrodes 100 and 200 at the intersection of the first and second electrodes 100 and 200 may be increased.

Comparing FIGS. 2B and 3B, the distance between the first and second electrodes 100 and 200 at the intersection of the first and second electrodes 100 and 200 in the touch region of FIG. 3B may be greater than the distance between the first and second electrodes 100 and 200 at the intersection of the first and second electrodes 100 and 200 in the fingerprint recognizing region of FIG. 2B. In other words, the thickness of the insulating layer 150 at the intersection of the first and second electrodes 100 and 200 in the touch region of FIG. 3B may be greater than the thickness of the insulating layer 150 at the intersection of the first and second electrodes 100 and 200 in the fingerprint recognizing region of FIG. 2B. The distance between the first and second electrodes 100 and 200 at the intersection of the first and second electrodes 100 and 200 in the touch region of FIG. 3B may be greater than the distance between the first and second electrodes 100 and 200 at the intersection of the first and second electrodes 100 and 200 in the fingerprint recognizing region of FIG. 2B by about 1.5 times or about 2 times. In this regard, mutual capacitance at the intersection of the first and second electrodes 100 and 200 in the touch region of FIG. 3B may be substantially or considerably less than mutual capacitance at the intersection of the first and second electrodes 100 and 200 in the fingerprint recognizing region of FIG. 2B.

In the cross-sectional view, a height difference between the first and second electrodes 100 and 200 at the intersection in the touch region of FIGS. 3A and 3B may be greater than a height difference between the first and second electrodes 100 and 200 at a non-intersection around the intersection in the touch region of FIGS. 3A and 3B. Also, the cross-sectional height difference between the first and second electrodes 100 and 200 at the non-intersection in the touch region of FIGS. 3A and 3B may be substantially the same as a cross-sectional height difference between the first and second electrodes 100 and 200 at the intersection in the fingerprint recognizing region of FIGS. 2A and 2B. In the cross-sectional view, an interval between the first and second electrodes 100 and 200 at the intersection in the touch region of FIGS. 3A and 3B may be selectively adjusted by using the step adjusting layer 50.

FIGS. 4A, 4B, 4C, 4D and 4E are cross-sectional views for describing a method of manufacturing a touch-fingerprint complex sensor, according to example embodiments.

Figure 4A:
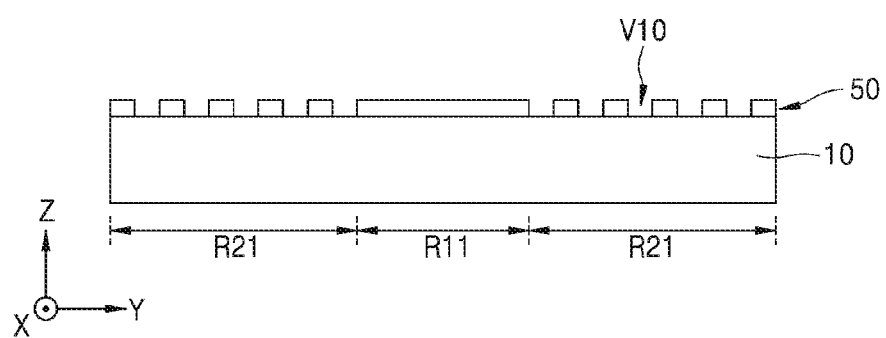
FIGS. 4A, 4B, 4C, 4D and 4E are cross-sectional views for describing a method of manufacturing a touch-fingerprint complex sensor, according to an example embodiment.

Referring to FIG. 4A, the step adjusting layer 50 may be formed on the substrate 10. The step adjusting layer 50 may be formed of an insulating material and may be transparent. The step adjusting layer 50 may have different pattern shapes in a fingerprint recognizing region R11 and a touch region R21 except for the fingerprint recognizing region R11. For example, the step adjusting layer 50 may include the plurality of via holes V10 formed in the touch region R21 excluding the fingerprint recognizing region R11. Each of the plurality of via holes V10 may have a diameter or width less than or equal to about 100 μm. A via hole may not be formed in the step adjusting layer 50 in the fingerprint recognizing region R11. The thickness of the step adjusting layer 50 may be, for example, about 20 μm, but is not limited thereto.

The step adjusting layer 50 may include an organic insulating material. When the step adjusting layer 50 is formed of an organic insulating material, for example, the step adjusting layer 50 may be formed by using a photosensitive (photoresist) material. In this case, an exposure process may be performed after forming a photosensitive material layer, and a post exposure bake (PEB) process may be further performed. In the PEB process, a region of the step adjusting layer 50 around the via hole V10 or an edge portion of the step adjusting layer 50 may somewhat reflow, and thus a step-coverage-related issue may not occur during a following process. However, a material and forming method of the step adjusting layer 50 described herein are only examples and thus are not limited thereto. In some cases, the step adjusting layer 50 may include an inorganic insulating material. Alternatively, the step adjusting layer 50 may not be separately formed, but the substrate 10 may be processed to use a part of the substrate 10 as a step adjusting layer.

Figure 4B:
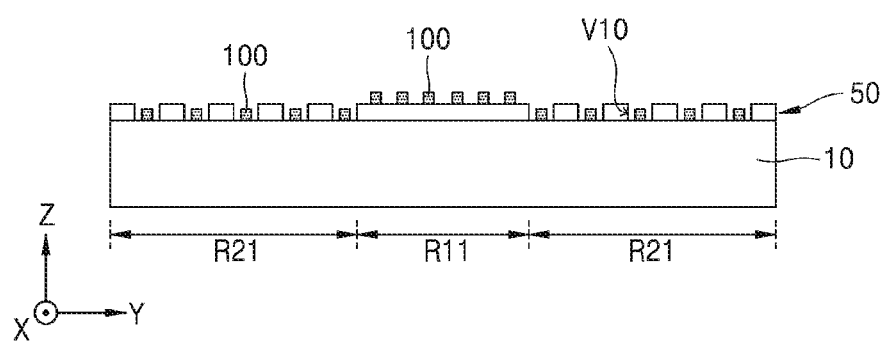

Referring to FIG. 4B, the plurality of first electrodes 100 may be formed on the substrate 10 and the step adjusting layer 50. The plurality of first electrodes 100 may have a structure extending, for example, in the X-axis direction. The first electrode 100 may recess towards the substrate 10 at the via hole V10. The first electrode 100 may not include a recessed portion in the fingerprint recognizing region R11. The plurality of first electrodes 100 may be formed by depositing a transparent electrode on the substrate 10 and the step adjusting layer 50 and performing photolithography and wet etching on the deposited transparent electrode.

Figure 4C:
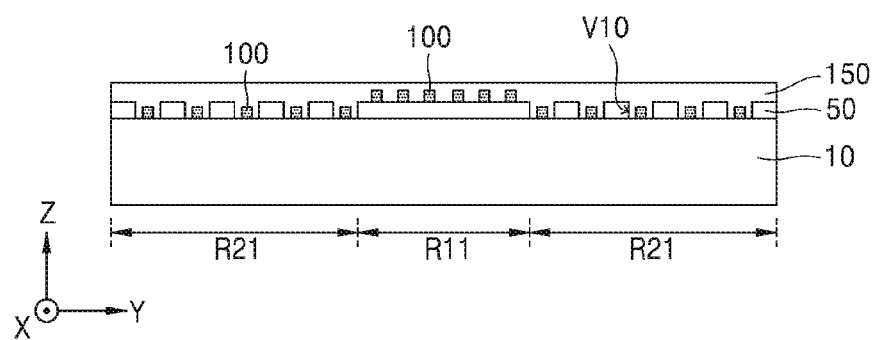

Referring to FIG. 4C, the insulating layer 150 covering the step adjusting layer 50 and the plurality of first electrodes 100 may be formed. The insulating layer 150 may include an organic material. The insulating layer 150 may be formed via, for example, a slot-die coating method. During the slot-die coating method, an organic insulating layer may be formed and then a reflow process or a planarization process may be performed on the organic insulating layer. Accordingly, the insulating layer 150 having a generally flat top surface may be formed. A forming method and material of the insulating layer 150 are not limited to the above and may vary. For example, the insulating layer 150 may include an inorganic material. The thickness of the insulating layer 150 may be less than or equal to about 15 μm or about 10 μm, but is not limited thereto.

Figure 4D:
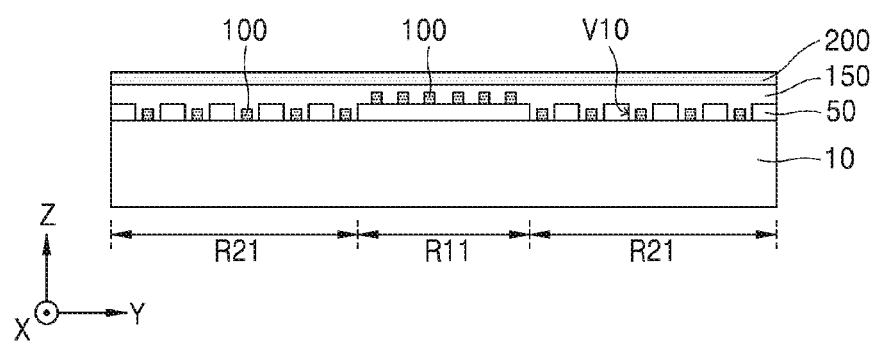

Referring to FIG. 4D, the plurality of second electrodes 200 may be formed on the insulating layer 150. Here, one second electrode 200 is illustrated, but in practice, the plurality of second electrodes 200 may be formed to be spaced apart in the X-axis direction. The plurality of second electrodes 200 may cross the plurality of first electrodes 100. The plurality of via holes V10 may be provided at locations corresponding to a plurality of intersections of the plurality of first electrodes 100 and the plurality of second electrodes 200 in the touch region R21 excluding the fingerprint recognizing region R11. The plurality of second electrodes 200 may be formed by depositing a transparent electrode on the insulating layer 150 and performing photolithography and wet etching on the deposited transparent electrode.

Figure 4E:
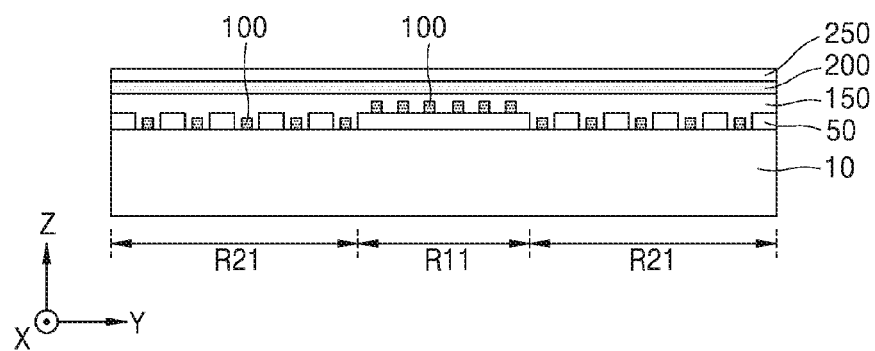

Referring to FIG. 4E, the passivation layer 250 covering the plurality of second electrodes 200 may be formed on the insulating layer 150. The passivation layer 250 may be formed of an insulating material and may include a thin film of a light-sensitive organic material and/or an inorganic material.

In the cross-sectional view, an interval between the first and second electrodes 100 and 200 may be adjusted to be different in the fingerprint recognizing region R11 and the touch region R21 by the step adjusting layer 50. The interval between the first and second electrodes 100 and 200 at an intersection of the first and second electrodes 100 and 200 in the touch region R21 may be greater than the interval between the first and second electrodes 100 and 200 at an intersection of the first and second electrodes 100 and 200 in the fingerprint recognizing region R11. In this regard, mutual capacitance between the first and second electrodes 100 and 200 at the intersection of the first and second electrodes 100 and 200 in the touch region R21 may be less than mutual capacitance between the first and second electrodes 100 and 200 at the intersection of the first and second electrodes 100 and 200 in the fingerprint recognizing region R11.

Figure 5A:
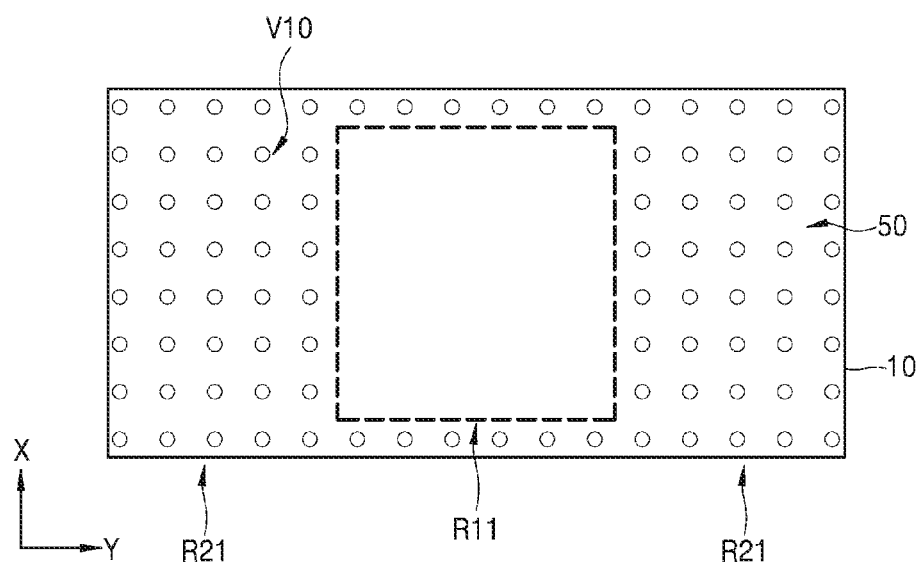
FIG. 5A is a plan view corresponding to an operation of FIG. 4A.

FIG. 5A is a plan view corresponding to an operation of FIG. 4A.

Referring to FIG. 5A, the step adjusting layer 50 including the plurality of via holes V10 may be formed on the substrate 10. The plurality of via holes V10 may be regularly formed (e.g., at a same distance interval) in the touch region R21 and may not be formed in the fingerprint recognizing region R11.

Figure 5B:
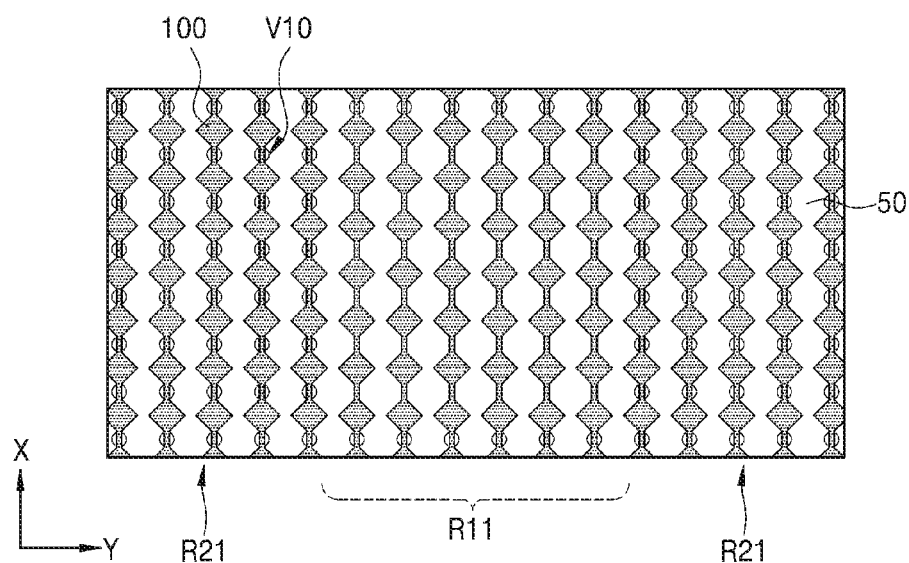
FIG. 5B is a plan view corresponding to an operation of FIG. 4B.

FIG. 5B is a plan view corresponding to an operation of FIG. 4B.

Referring to FIG. 5B, the plurality of first electrodes 100 may be formed on the step adjusting layer 50. The plurality of first electrodes 100 may, for example, extend in the X-axis direction and be spaced apart from each other in the Y-axis direction.

Figure 5C:
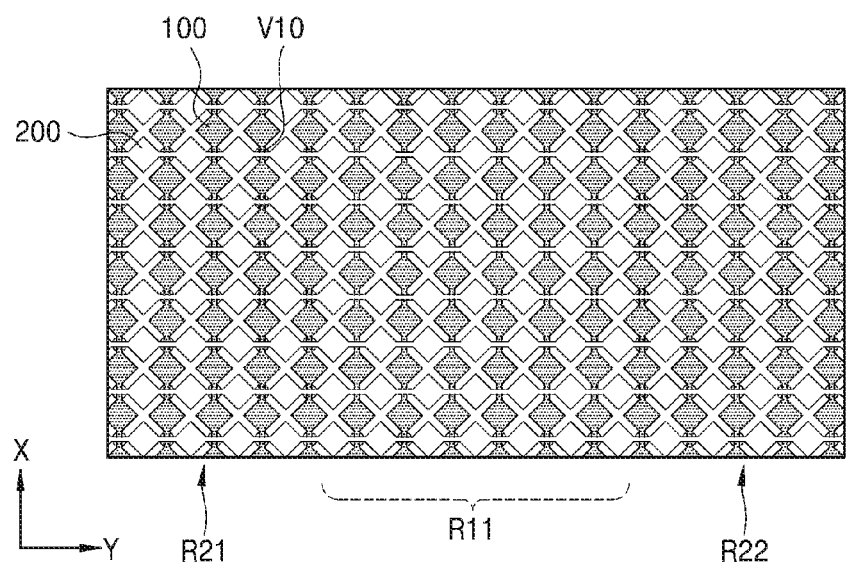
FIG. 5C is a plan view corresponding to an operation of FIG. 4D.

FIG. 5C is a plan view corresponding to an operation of FIG. 4D.

Referring to FIG. 5C, the plurality of second electrodes 200 extending in a direction crossing the plurality of first electrodes 100 may be formed. The plurality of second electrodes 200 may, for example, extend in the Y-axis direction and be spaced apart from each other in the X-axis direction. The plurality of via holes V10 may be located to correspond to the intersections of the first and second electrodes 100 and 200 in the touch regions R21.

According to the example embodiments, a touch-fingerprint complex sensor capable of sensing both a touch and a fingerprint on one screen while having improved sensing performance may be realized. A touch-fingerprint sensor that is advantageous in enlargement and high-speed driving and capable of resolving visibility and Moiré issues may be realized. Also, a touch-fingerprint complex sensor that is capable of increasing a sensing depth of fingerprint recognition and increasing a sensing characteristic may be realized.

In a general electrostatic type on-screen touch-fingerprint sensor, enlargement is difficult, a driving speed is limited, and a sensing depth during fingerprint recognition is limited. When a transparent electrode is used, there is a limitation in enlargement and improving a driving speed because the transparent electrode has a relatively high resistance value. Also, when a minute (fine) electrode pattern is used to improve visibility and Moiré, a capacitance value is increased in a touch region according to an increase in the number of nodes. Accordingly, it is difficult to enlarge a touch pad and increase a driving speed. In terms of fingerprint recognition, a high input value and an impedance value increase a sensing depth, and when such values are satisfied, RC delay may increase during touch detection.

In a touch-fingerprint complex sensor according to the example embodiments, cross-sectional intervals between first and second electrodes are set to be different in a fingerprint recognizing region and a touch region excluding the fingerprint recognizing region such that a capacitance value is relatively high in the fingerprint recognizing region and relatively low in the touch region. The cross-sectional interval between the first and second electrodes at a desired location may be adjusted by using a step adjusting layer, thereby adjusting a capacitance value. Mutual capacitance at an intersection of the first and second electrodes in the touch region may be less than mutual capacitance at an intersection of the first and second electrodes in the fingerprint recognizing region. Because a low mutual capacitance value is used during touch detection, enlargement may be realized and driving speed may be increased. In terms of touch detection, it may be easier to manufacture a touch sensor having a long length when mutual capacitance is low. During fingerprint recognition, a depth (sensing distance) of the fingerprint recognition may be increased by using a high mutual capacitance value, and a sensing characteristic may be increased. When mutual capacitance at an intersection is high, a mutual capacitance difference by a fingerprint during the fingerprint recognition may also be high. Accordingly, a fingerprint recognition rate may be increased and the touch-fingerprint complex sensor may be used as an under glass fingerprint sensor of a large-scale device. Also, because the touch-fingerprint complex sensor according to an example embodiment uses a substantially uniform minute (fine) electrode pattern overall, a change in visibility may be reduced and Moiré formation may be suppressed. Also, according to the example embodiments, only the cross-sectional interval at the intersection of the first and second electrodes is selectively controlled by adjusting a pattern, size, location, etc. of the step adjusting layer, a visibility (transmittance and reflectivity) difference between the fingerprint recognizing region and the touch region is reduced, and fringe capacitance between the first and second electrodes may be reduced.

In FIGS. 4A through 4E, the step adjusting layer 50 is separately formed on the substrate 10, and then a following process is performed. Alternatively, an upper portion of the substrate 10 may be patterned and the patterned upper portion of the substrate 10 may be used as a step adjusting layer. In other words, an uneven portion may be formed on the upper portion of the substrate 10, and the uneven portion may be used as a step adjusting layer.

Also, in FIG. 4E, the plurality of first electrodes 100 and the plurality of second electrodes 200 are provided on different levels. Alternatively, the plurality of first electrodes and some parts (first parts) of the plurality of second electrodes may be provided on the same level, and some other parts (second parts) of the plurality of second electrodes may be provided on a level different from the level. This will be described with reference to FIGS. 6A through 6E.

FIGS. 6A, 6B, 6C, 6D and 6E are cross-sectional views for describing a method of manufacturing a touch-fingerprint complex sensor, according to other example embodiments.

Figure 6A:
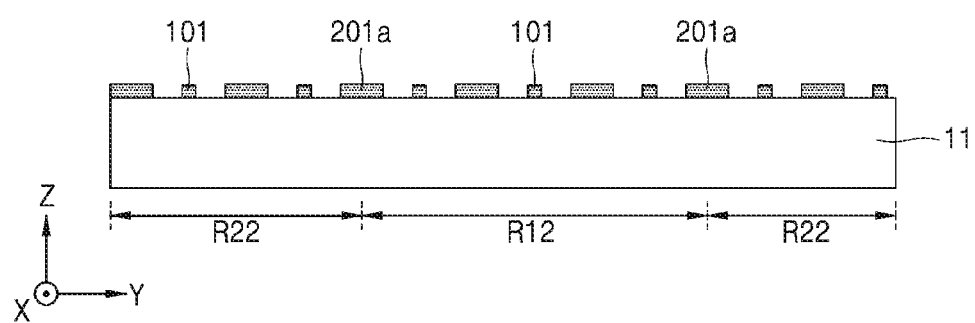
FIGS. 6A, 6B, 6C, 6D and 6E are cross-sectional views for describing a method of manufacturing a touch-fingerprint complex sensor, according to another example embodiment.

Referring to FIG. 6A, a plurality of first electrodes 101 and a plurality of first pattern portions 201a corresponding to first parts of a plurality of second electrodes may be formed on a substrate 11. The plurality of first electrodes 101 may be arranged in parallel in the X-axis direction, for example. The plurality of first pattern portions 201a may be arranged between and two sides of the plurality of first electrodes 101. The plurality of first electrodes 101 and the plurality of first pattern portions 201a may be formed on the same level to form a single layer structure. The plurality of first electrodes 101 and the plurality of first pattern portions 201a may be formed by depositing a transparent electrode on the substrate 11 and performing photolithography and wet etching on the deposited transparent electrode.

Figure 6B:
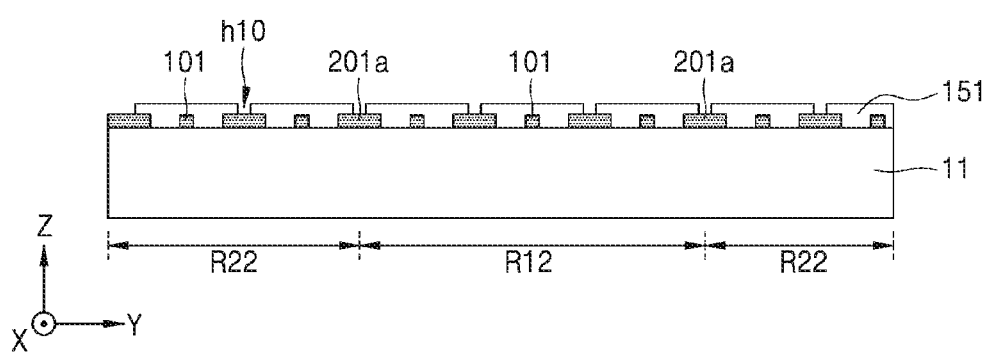

Referring to FIG. 6B, an insulating layer 151 covering the plurality of first electrodes 101 and the plurality of first pattern portions 201a may be formed on the substrate 11. The insulating layer 151 may include a plurality of openings h10 exposing a portion of the first pattern portions 201a. The opening h10 may be formed for each first pattern portion 201a. The insulating layer 151 may include a thin film of a light-sensitive organic material and may be formed via a coating process and hardening process. In some cases, the insulating layer 151 may include an inorganic material. The plurality of openings h10 may be formed by performing a photolithography on the insulating layer 151.

Figure 6C:
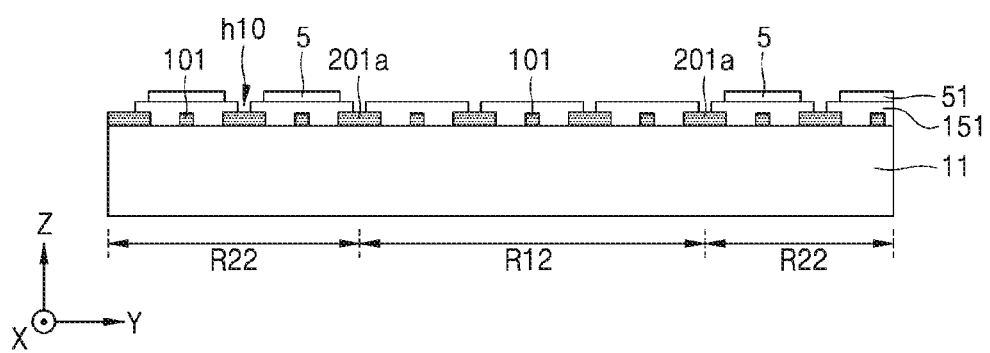

Referring to FIG. 6C, a step adjusting layer 51 including a plurality of pattern layers 5 may be formed on a portion of the insulating layer 151 in a touch region R22 excluding a fingerprint recognizing region R12. The plurality of pattern layers 5 may be an island-type pattern layer. Each of the plurality of pattern layers 5 may have a width less than or equal to about 150 µm, and when viewed from the top, may be rectangular, square, or circular. The pattern layer 5 may not be formed in the fingerprint recognizing region R12. The step adjusting layer 51 may be formed of a material that is the same as or different from the insulating layer 151, e.g., a thin-film of a light-sensitive organic material. The plurality of pattern layers 5 may be formed by performing a photolithography on the step adjusting layer 51.

Figure 6D:
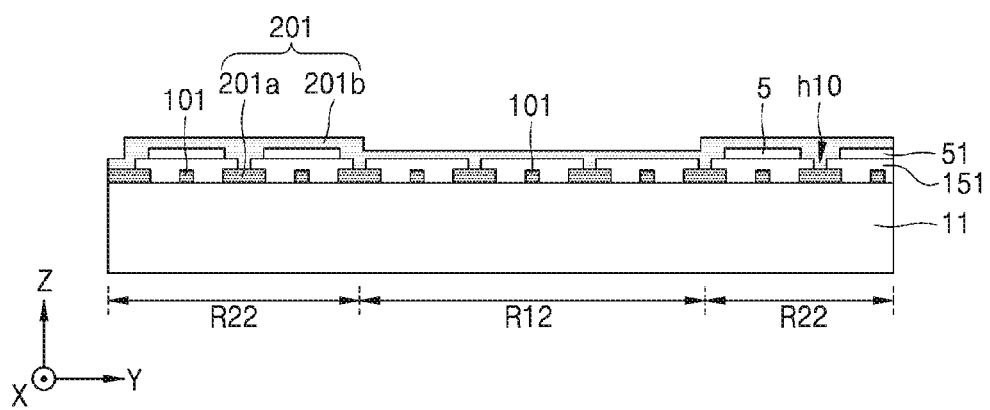

Referring to FIG. 6D, a plurality of second pattern portions 201b corresponding to second parts of the plurality of second electrodes may be formed on the insulating layer 151 and the step adjusting layer 51. Here, only one second pattern portion 201b is illustrated, but the plurality of second pattern portions 201b spaced apart from each other in the X-axis direction may be provided. The second pattern portion 201b may extend, for example, in the Y-axis direction. The second pattern portion 201b may have a line pattern. Also, the second pattern portions 201b may be connected to the corresponding first pattern portions 201a through the openings h10 to have a bridge structure connecting the first pattern portions 201a to each other. The plurality of first pattern portions 201a and the plurality of second pattern portions 201b may form a plurality of second electrodes 201 extending in the Y-axis direction. The plurality of second pattern portions 201b may be formed by depositing a transparent electrode on the insulating layer 151 and the step adjusting layer 51 and performing photolithography and wet etching on the deposited transparent electrode.

Figure 6E:
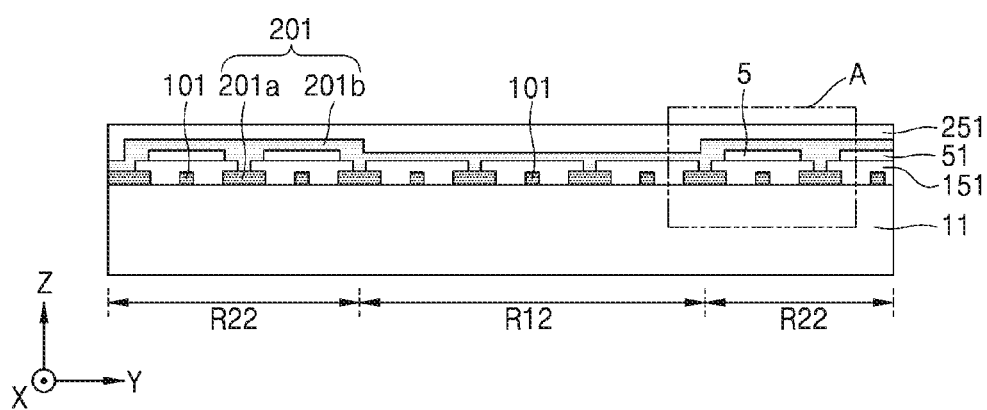

Referring to FIG. 6E, a passivation layer 251 covering the plurality of second pattern portions 201b may be formed on the substrate 11. The passivation layer 251 may be formed of an insulating material, e.g., a thin-film of an organic material.

The plurality of pattern layers 5 of the step adjusting layer 51 may be selectively provided at locations corresponding to a plurality of intersections of the first and second electrodes 101 and 201 in the touch region R22. In the cross-sectional view, a distance (interval) between the first and second electrodes 101 and 201 at the intersection of the first and second electrodes 101 and 201 in the touch region R22 may be increased by the plurality of pattern layers 5 formed in the touch region R22, i.e., the step adjusting layer 51. Accordingly, the distance (interval) between the first and second electrodes 101 and 201 at the intersection of the first and second electrodes 101 and 201 in the touch region R22 may be greater than a distance (interval) between the first and second electrodes 101 and 201 at an intersection of the first and second electrodes 101 and 201 in the fingerprint recognizing region R21. Also, mutual capacitance between the first and second electrodes 101 and 201 at the intersection of the first and second electrodes 101 and 201 in the touch region R22 may be less than mutual capacitance between the first and second electrodes 101 and 201 at the intersection of the first and second electrodes 101 and 201 in the fingerprint recognizing region R21

Figure 7:
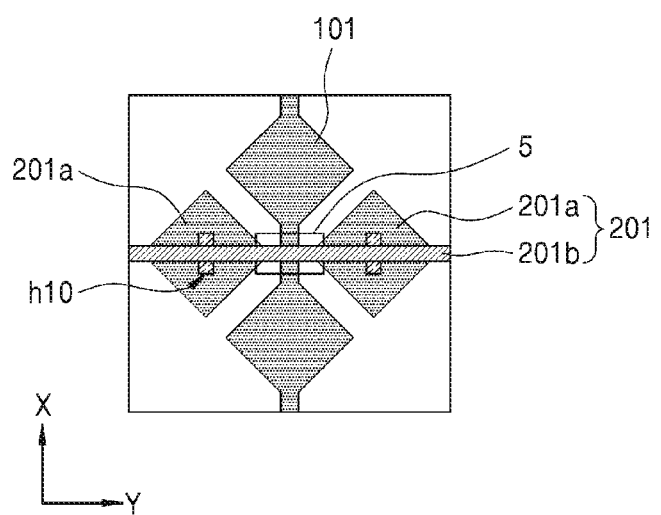
FIG. 7 is a plan view of an example of a plane structure of a region A of FIG. 6E.

FIG. 7 is a plan view of an example of a plane structure of a region A of FIG. 6E.

Referring to FIG. 7, the first electrodes 101 and the first pattern portions 201a of the second electrodes 201 may be provided on the substrate 11 of FIG. 6E. The insulating layer 151 of FIG. 6E covering the first electrodes 101 and the first pattern portions 201a may be formed, and the openings h10 exposing portions of the first pattern portions 201a may be formed in the insulating layer 151. One opening h10 may be formed for each first pattern portion 201a. The pattern layer 5 of the step adjusting layer 51 of GIG. 6E may be provided on the insulating layer 151. The pattern layer 5 may be an island-type. The second pattern portion 201b of the second electrodes 201 may be provided on the insulating layer 151 and the pattern layer 5. The second pattern portion 201b may be electrically connected to the first pattern portions 201a through the openings h10. A conductor (plug) may be provided in the opening h10. The pattern layer 5 of the step adjusting layer 51 may be selectively provided at locations corresponding to intersections of the first and second electrodes 101 and 201 in a touch region.

Figure 8:
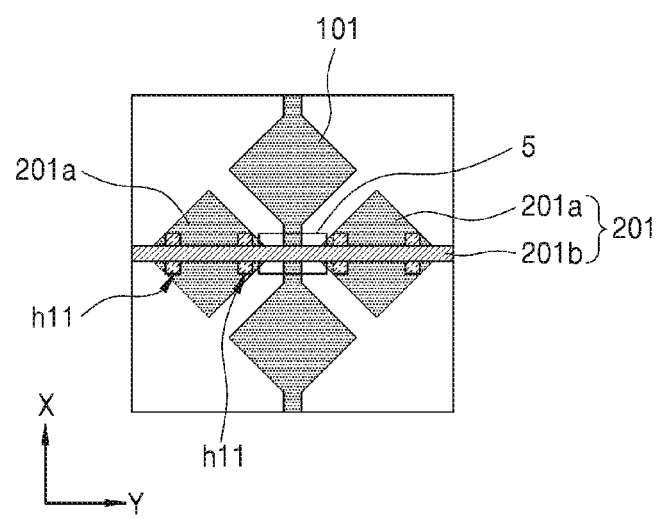
FIG. 8 is a plan view of a modified example of FIG. 7.

FIG. 8 is a plan view of a modified example of FIG. 7. In FIG. 8, the number and locations of the openings h10 are different from FIG. 7.

Referring to FIG. 8, two openings h11 may be provided for each of the plurality of first pattern portions 201a. Here, a center portion of the first pattern portion 201a may be provided between the two openings h11. Because the center portion of the first pattern portion 201a is not covered by a conductor (plug) of the opening h11, a sensing characteristic may be further increased.

The touch-fingerprint complex sensor according to the example embodiments of FIGS. 4E and 6E may have a two-electrode structure using two types of electrodes (the first and second electrodes 100 and 200, and 101 and 201) provided on one side (upper surface) of the substrates 10 and 11. In FIG. 4E, the plurality of first electrodes 100 and the plurality of second electrodes 200 are arranged on the same surface (top surface) of the substrate 10, and in FIG. 6E, the plurality of first electrodes 101 and the plurality of second electrodes 201 are arranged on the same surface (top surface) of the substrate 11. Thus, compared to using a triple electrode structure or forming an additional electrode on a rear surface of a substrate, the touch-fingerprint complex sensor according to one or more embodiments is easily manufactured and advantageous in circuit configuration and a driving method.

Also, the touch-fingerprint complex sensor according to one or more embodiments may be a flexible sensor and/or a foldable sensor. The substrate 10 or 11, the step adjusting layer 50, and the insulating layer 150 or 151 may include an organic material, and in this case, the touch-fingerprint complex sensor may be a flexible or foldable sensor. Accordingly, the touch-fingerprint complex sensor may be applied to a flexible device and a foldable device. The touch-fingerprint complex sensor may be easily applied to a flexible/foldable and mobile/large-scale touch display, which uses fingerprint authentication. However, the touch-fingerprint complex sensor according to an embodiment may not be flexible.

Figure 9:
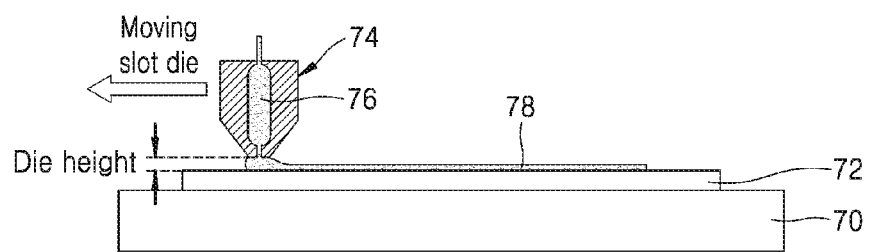
FIG. 9 is a diagram for describing a slot-die coating process that may be applied to form an insulating layer during manufacture of a touch-fingerprint complex sensor, according to an example embodiment.

FIG. 9 is a diagram for describing a slot-die coating process that may be applied to form an insulating layer during manufacture of a touch-fingerprint complex sensor, according to an example embodiment.

Referring to FIG. 9, a coating solution 76 including an organic material may be coated on a substrate structure 72 fixed to a base 70 by moving a slot-die head 74 on the substrate structure 72 while supplying the coating solution 76 to the slot-die head 74. Here, the substrate structure 72 and the slot-die head 74 may be spaced apart from each other by an interval in a vertical direction. The interval is referred to as a die height.

By using such a slot-die coating method, an organic insulating layer 78 may be formed on the substrate structure 72, and a reflow process or planarization process may be further performed on the organic insulating layer 78. The slot-die coating method may be used while manufacturing the touch-fingerprint complex sensor according to an example embodiment, for example, while forming the insulating layer 150 of FIG. 4C.

Figure 10:
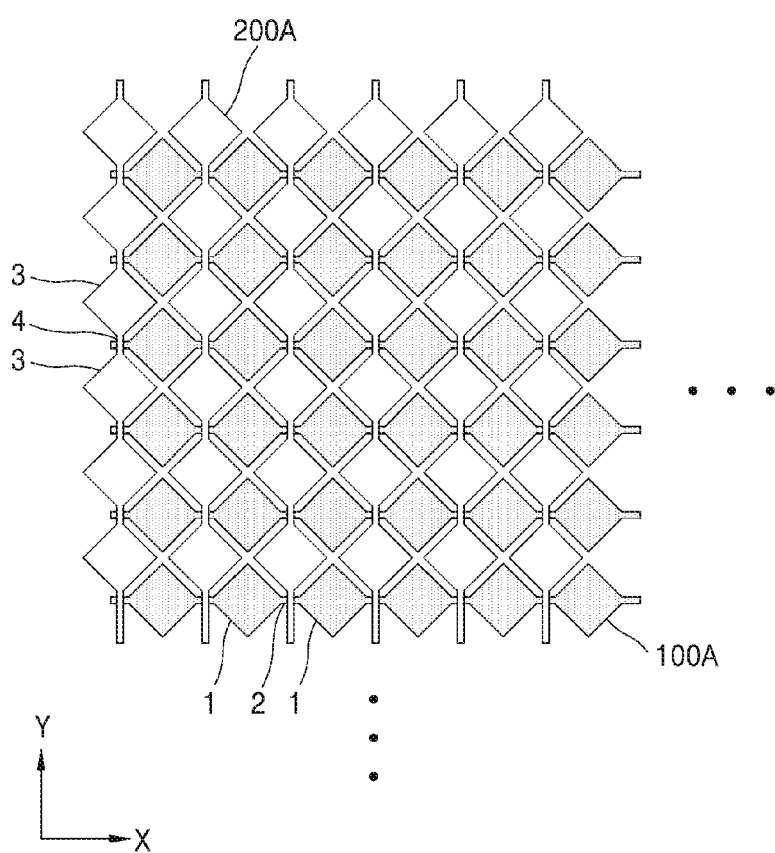
FIG. 10 is a plan view for describing configurations of a plurality of first electrodes and a plurality of second electrodes, which are applicable to a touch-fingerprint complex sensor, according to an example embodiment.

FIG. 10 is a plan view for describing configurations of the plurality of first electrodes 100A and the plurality of second electrodes 200A, which are applicable to a touch-fingerprint complex sensor, according to an example embodiment.

Referring to FIG. 10, the touch-fingerprint complex sensor may include the plurality of first electrodes 100A extending in a first direction, for example, an X-axis direction, and the plurality of second electrodes 200A extending in a second direction, for example, a Y-axis direction. The first electrode 100A may include a plurality of rhombus shape pattern portions 1 and a connecting portion 2 between the plurality of rhombus shape pattern portions 1. Similarly, the second electrode 200A may include a plurality of rhombus shape pattern portions 3 and a connecting portion 4 between the plurality of rhombus shape pattern portions 3. The connecting portion 4 of the second electrode 200A may be disposed to correspond to the connecting portion 2 of the first electrode 100A. An insulating layer may be provided between the plurality of first electrodes 100A and the plurality of second electrodes 200A. Capacitance, i.e., mutual capacitance, may be formed between the plurality of first electrodes 100A and the plurality of second electrodes 200A. The first and second electrodes 100A and 200A may each be formed of transparent conductive oxide (TC), such as indium tin oxide (ITO), indium zinc oxide (IZO), aluminum zinc oxide (AZO), gallium zinc oxide (GZO), aluminum gallium zinc oxide (AGZO), or gallium indium zinc oxide (GIZO). Here, the pluralities of first and second electrodes 100A and 200A include the rhombus shape pattern portions 3 and 4 and the connecting portions 2 and 4 therebetween, but the configurations of the first and second electrodes 100A and 200A may vary. The pluralities of the first and second electrodes 100A and 200A may have pattern portions in polygonal shapes instead of rhombus shapes, and either one or both of the pluralities of the first and second electrodes 100A and 200A may have a line pattern.

Figure 11:
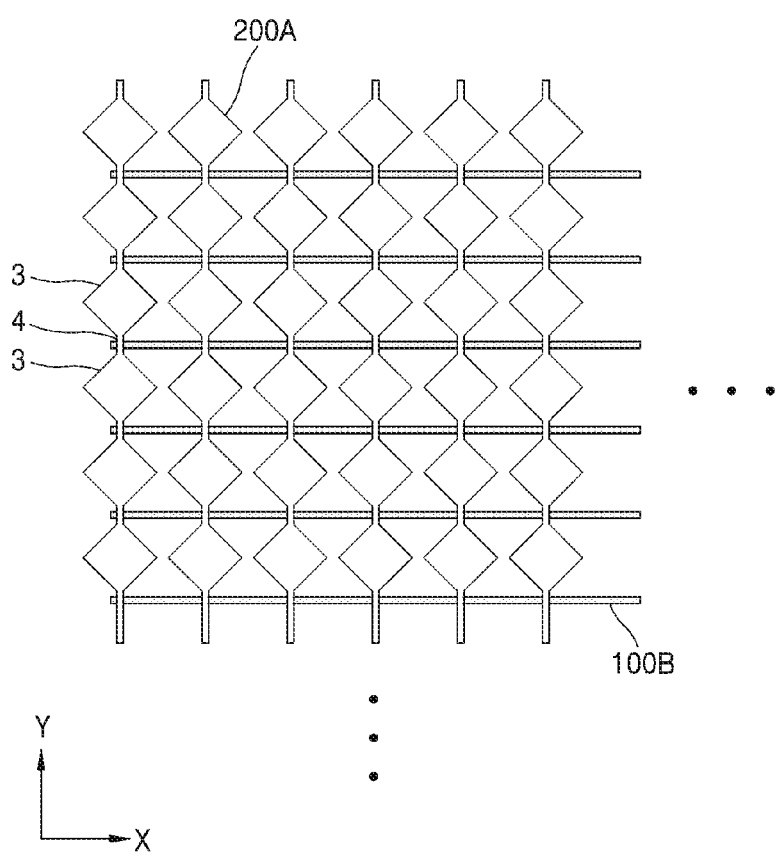
FIG. 11 is a plan view for describing configurations of a plurality of first electrodes and a plurality of second electrodes, which are applicable to a touch-fingerprint complex sensor, according to another example embodiment.

FIG. 11 is a plan view for describing configurations of a plurality of first electrodes 100B and the plurality of second electrodes 200A, which are applicable to a touch-fingerprint complex sensor, according to another example embodiment.

Referring to FIG. 11, the touch-fingerprint complex sensor may include the plurality of first electrodes 100B extending in an X-axis direction and the plurality of second electrodes 200A extending in a Y-axis direction crossing the X-axis direction. The first electrode 100B may have a line pattern, and the second electrode 200A may include the plurality of rhombus shape pattern portions 3 and the connecting portion 4 between the plurality of rhombus shape pattern portions 3.

The plurality of first electrodes 100B may be formed of a metal, an alloy, or a metal compound. Because the first electrode 100B may have a width of several μm, the first electrode 100B may appear transparent to the naked eye even when the first electrode 100B is formed of a metal. In some cases, the first electrode 100B may be formed of a transparent electrode material. The second electrode 200A may be formed of a transparent conductive oxide like the second electrode 200A of FIG. 10.

In the example embodiments, the first electrode 100B having the line pattern may have excellent electric conductivity, and the second electrode 200A having the rhombus shape pattern portions 3 may have excellent transparency. Accordingly, the touch-fingerprint complex sensor according to the embodiments may have both excellent electric conductivity and excellent transparency.

Figure 12:
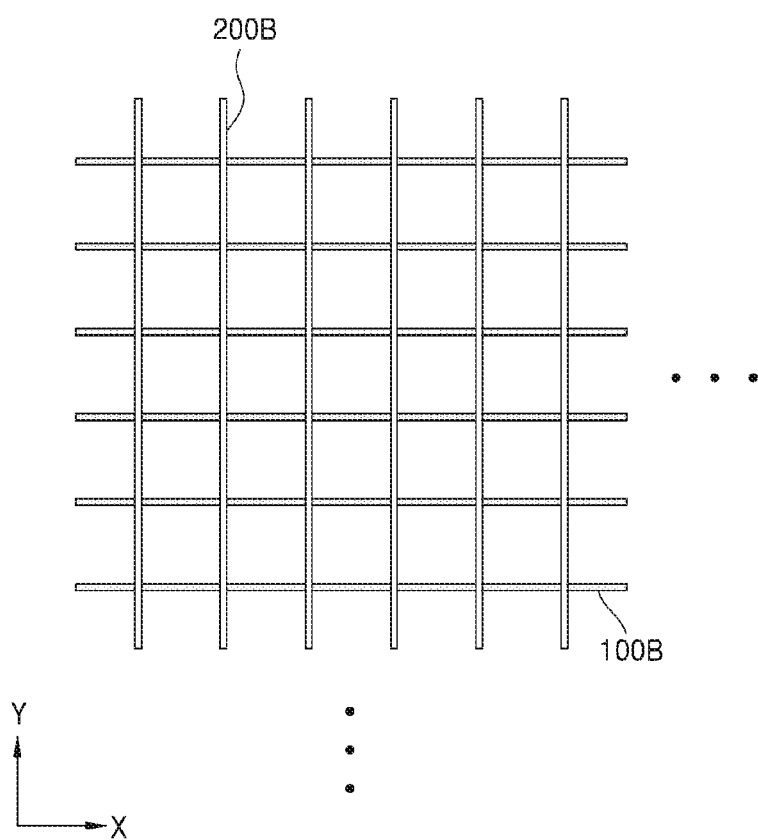
FIG. 12 is a plan view for describing configurations of a plurality of first electrodes and a plurality of second electrodes, which are applicable to a touch-fingerprint complex sensor, according to another example embodiment.

FIG. 12 is a plan view for describing configurations of the plurality of first electrodes 100B and a plurality of second electrodes 200B, which are applicable to a touch-fingerprint complex sensor, according to another example embodiment.

Referring to FIG. 12, the touch-fingerprint complex sensor may include the plurality of first electrodes 1008 extending in an X-axis direction and the plurality of second electrodes 200B extending in a Y-axis direction crossing the X-axis direction. The first electrode 100B and the second electrode 200A may all have a line pattern.

Figure 13:
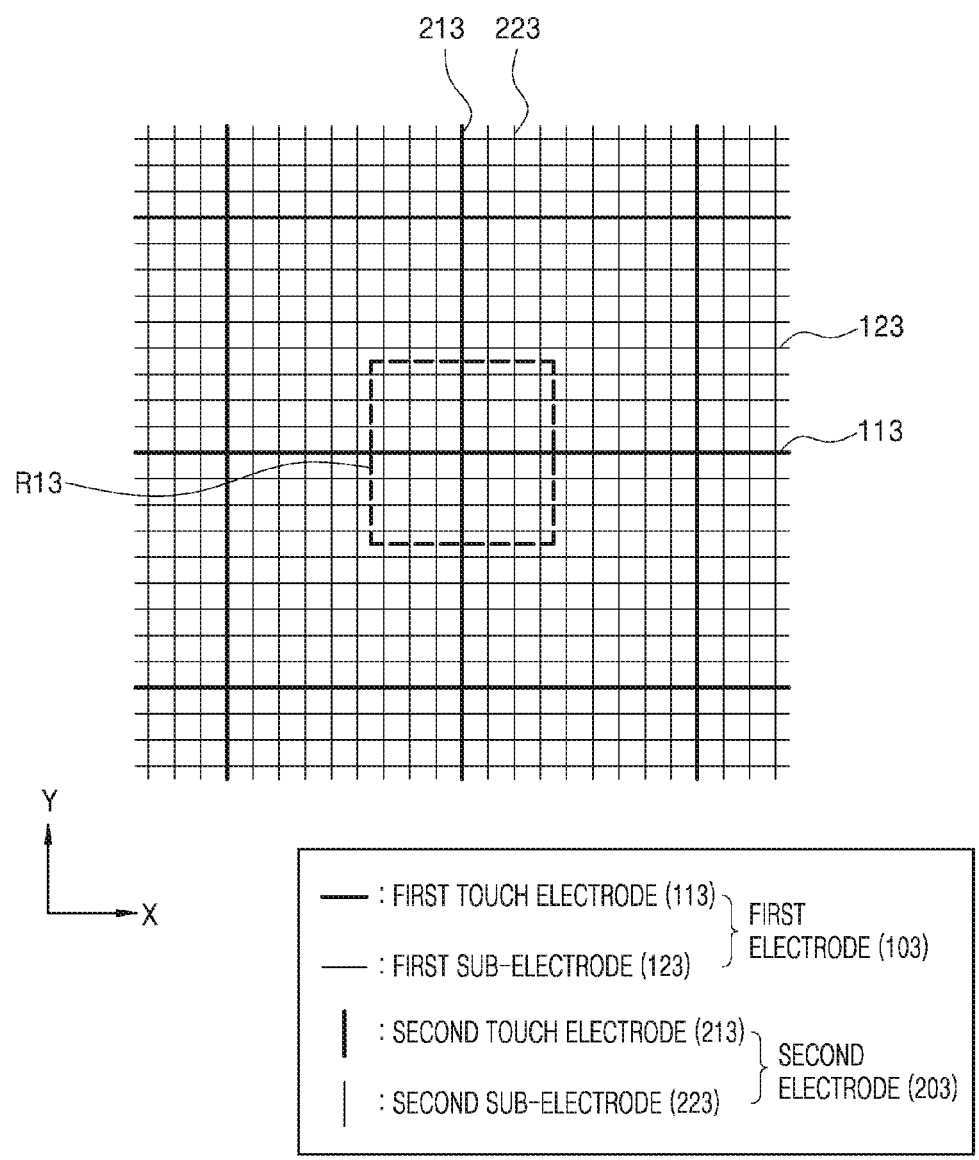
FIG. 13 is a plan view for describing a touch-fingerprint complex sensor according to an example embodiment.

FIG. 13 is a plan view for describing a touch-fingerprint complex sensor according to an example embodiment.

Referring to FIG. 13, a plurality of first electrodes 103 may extend in an X-axis direction and a plurality of second electrodes 203 may extend in a Y-axis direction crossing the X-axis direction. The plurality of first electrodes 103 may include a plurality of first touch electrodes 113 spaced apart from each other at regular intervals and a plurality of first sub-electrodes 123 provided between and two sides of the plurality of first touch electrodes 113. Similarly, the plurality of second electrodes 203 may include a plurality of second touch electrodes 213 spaced apart from each other at regular intervals and a plurality of second sub-electrodes 223 provided between and two sides of the plurality of second touch electrodes 213. A reference numeral R13 indicates a fingerprint recognizing region.

The plurality of first touch electrodes 113 may not be electrically grouped, but may be independently arranged. In other words, end portions of the plurality of first touch electrodes 113 may not be electrically/physically directly connected to each other. Similarly, the plurality of second touch electrodes 213 may not be electrically grouped, but may be independently arranged. In other words, end portions of the plurality of second touch electrodes 213 may not be electrically/physically directly connected to each other.

Figure 14:
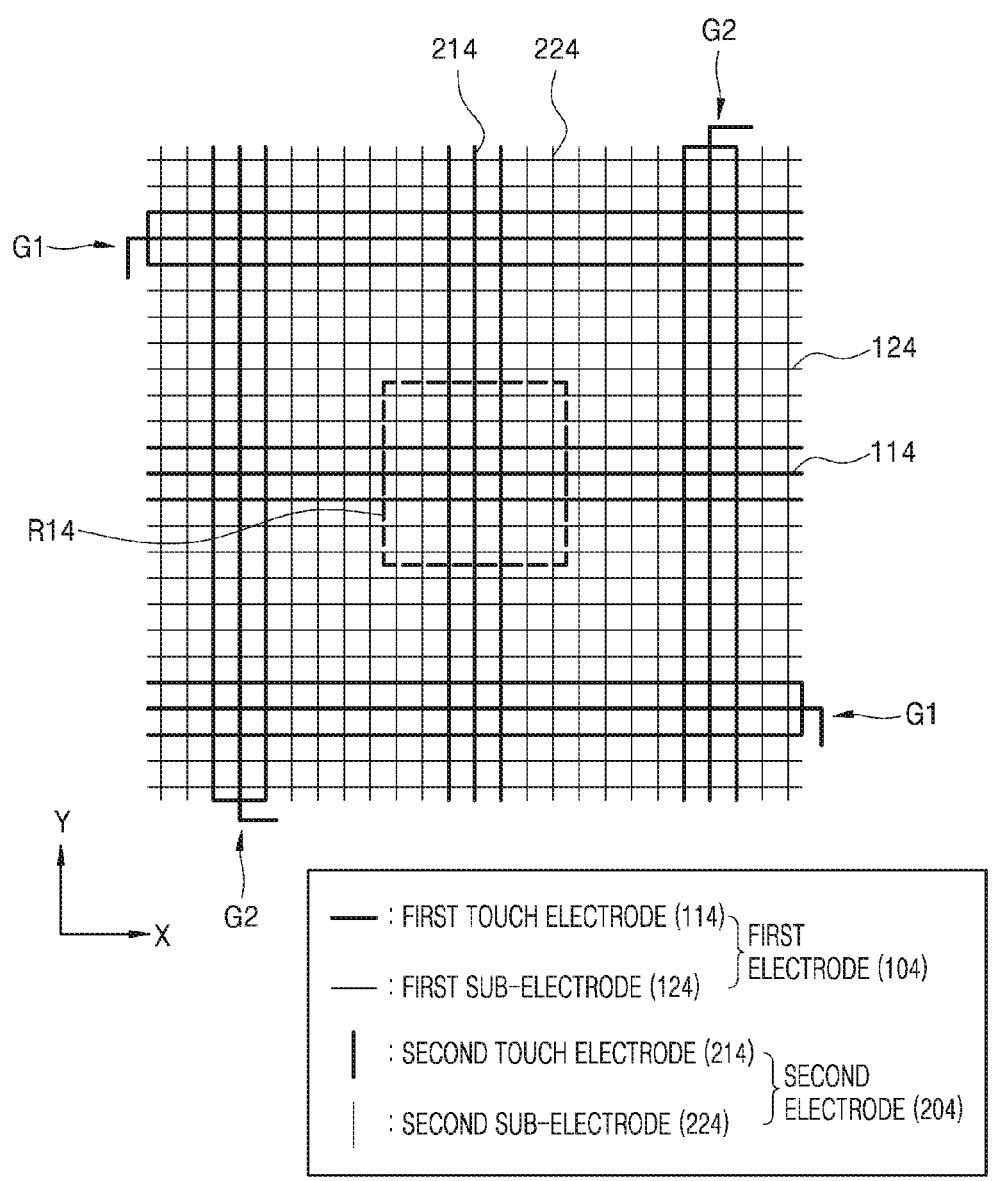
FIG. 14 is a plan view for describing a touch-fingerprint complex sensor according to another example embodiment.

FIG. 14 is a plan view for describing a touch-fingerprint complex sensor according to another example embodiment.

Referring to FIG. 14, a plurality of first electrodes 104 may extend in an X-axis direction and a plurality of second electrodes 204 may extend in a Y-axis direction crossing the X-axis direction. The plurality of first electrodes 104 may include a plurality of first touch electrodes 114 and a plurality of first sub-electrodes 124. Similarly, the plurality of second electrodes 204 may include a plurality of second touch electrodes 214 and a plurality of second sub-electrodes 224. A reference numeral R14 indicates a fingerprint recognizing region.

The plurality of first touch electrodes 114 may have a structure in which unit groups G1 including a plurality of electrodes that are electrically grouped are regularly arranged, e.g., at a same number interval of electrodes. The first touch electrodes 114 of each unit group G1 may be adjacently arranged. The plurality of first sub-electrodes 124 may be arranged between the unit groups G1.

The plurality of second touch electrodes 214 may have a structure in which unit groups G2 including a plurality of electrodes that are electrically grouped are regularly arranged, e.g., at a same number interval of electrodes. The second touch electrodes 214 of each unit group G2 may be adjacently arranged. The plurality of second sub-electrodes 224 may be arranged between the unit groups G2.

The first electrodes 104 in the fingerprint recognizing region R14 may be independently driven, and the second electrodes 204 in the fingerprint recognizing region R14 may also be independently driven.

Figure 15:
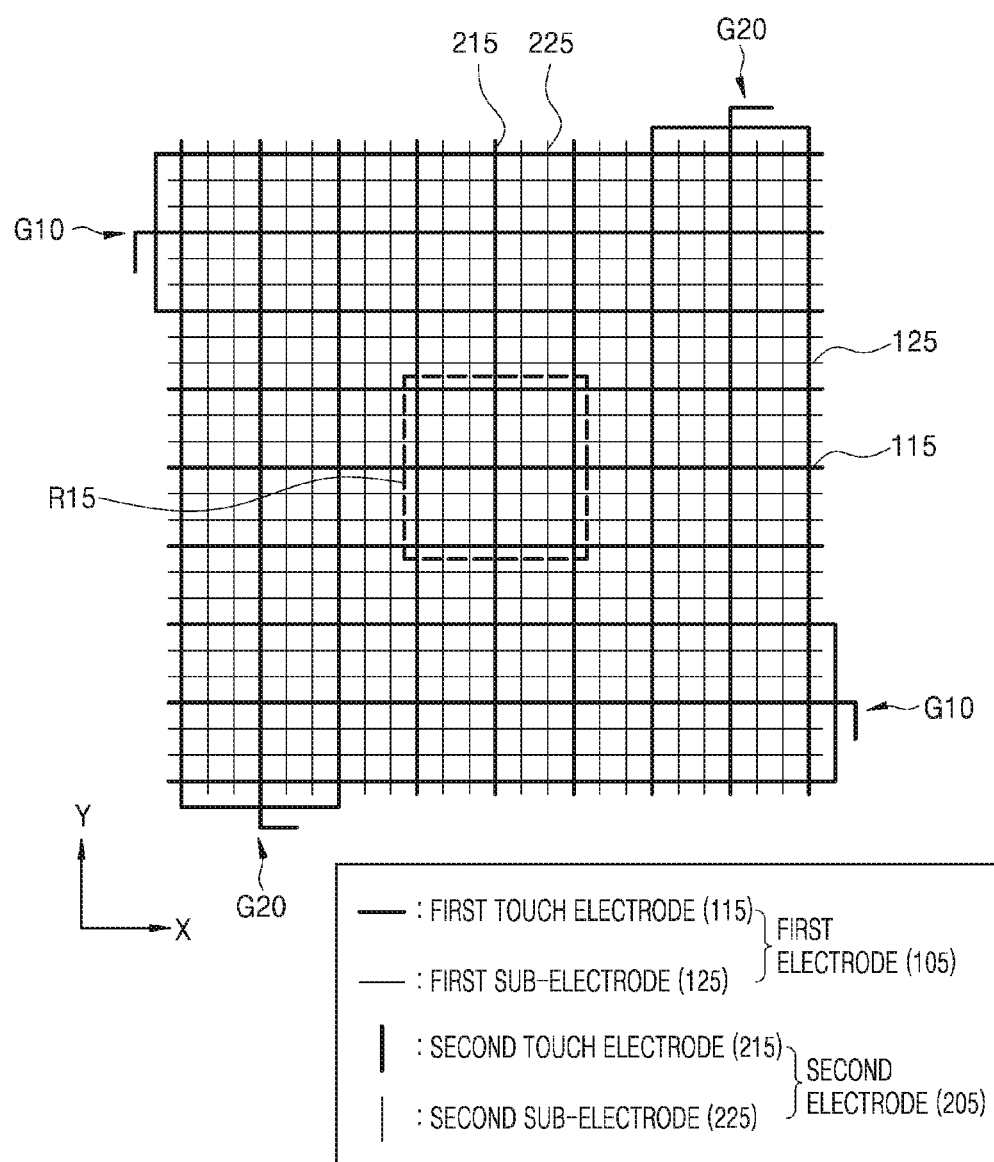
FIG. 15 is a plan view for describing a touch-fingerprint complex sensor according to another example embodiment.

FIG. 15 is a plan view for describing a touch-fingerprint complex sensor according to another example embodiment.

Referring to FIG. 15, a plurality of first electrodes 105 may include a plurality of first touch electrodes 115 arranged substantially at regular intervals and a plurality of first sub-electrodes 125 arranged between and/or two sides of the plurality of first touch electrodes 115. Similarly, a plurality of second electrodes 205 may include a plurality of second touch electrodes 215 arranged substantially at regular intervals and a plurality of second sub-electrodes 225 arranged between and/or two sides of the plurality of second touch electrodes 215.

The plurality of first touch electrodes 115 may include electrodes of a first unit group G10, which are electrically connected to each other, and at least one first sub-electrode 125 may be arranged between the electrodes of the first unit group G10. In other words, some of the first touch electrodes 115 may be electrically grouped in an unit and the at least one first sub-electrode 125 may be arranged between the grouped first touch electrodes 115.

The plurality of second touch electrodes 215 may include electrodes of a second unit group G20, which are electrically connected to each other, and at least one second sub-electrode 225 may be arranged between the electrodes of the second unit group G20. In other words, some of the second touch electrodes 215 may be electrically grouped in an unit and the at least one second sub-electrode 225 may be arranged between the grouped second touch electrodes 215.

The plurality of first touch electrodes 115 may be uniformly arranged overall and the plurality of second touch electrodes 215 may also be uniformly arranged overall. The first electrodes 105 in a fingerprint recognizing region R15 may be independently driven and the second electrodes 205 in the fingerprint recognizing region R15 may also be independently driven.

In a fingerprint recognizing mode, the first electrodes 105 corresponding to the fingerprint recognizing region R15 among the plurality of first electrodes 105 and the second electrodes 205 corresponding to the fingerprint recognizing region R15 among the plurality of second electrodes 205 may be selectively activated, and a fixed bias voltage may be applied to the remaining ones of the first and second electrodes 105 and 205. In the fingerprint recognizing region R15, electrode patterns, i.e., the first and second electrodes 105 and 205, may be arranged at intervals of tens of µm, for example, about 20 to 120 µm.

In a touch detecting mode, the plurality of first touch electrodes 115 and the plurality of second touch electrodes 215 may be selectively activated in the entire region of a touch pad, and a fixed bias voltage may be applied to the plurality of first sub-electrodes 125 and the plurality of second sub-electrodes 225. In the touch detecting mode, the plurality of first sub-electrodes 125 and the plurality of second sub-electrodes 225 may be used as dummy electrodes. The plurality of first touch electrodes 115 may be arranged at, for example, intervals of about 0.5 to 5 mm, and the plurality of second touch electrodes 215 may also be arranged at, for example, intervals of about 0.5 to 5 mm. The plurality of first touch electrodes 115 may be a transmit (Tx) electrode and the plurality of second touch electrodes 215 may be a receive (Rx) electrode, or vice versa.

Basic methods of fingerprint recognition and touch detection may be the same in the example embodiments of FIGS. 13 and 14. Also, the intervals between the first electrodes 105 and the intervals between the second electrodes 205 may be the same in the example embodiments of FIGS. 13 and 14. For convenience, in FIG. 15, one first unit group G10 is on each side of the fingerprint recognizing region R15 in the Y-axis direction, but in practice, the number of first unit groups G10 may be more than 1. Similarly, in FIG. 15, one second unit group G20 is on each side of the fingerprint recognizing region R15 in the X-axis direction, but in practice, the number of second unit groups G20 may be more than 1. The same may be applied to FIGS. 13 and 14.

During touch detection, first and second touch electrodes may all be activated throughout a touch panel including a fingerprint recognizing region. Here, capacitance measured in the first and second touch electrodes in the fingerprint recognizing region may be greater than capacitance measured in the first and second touch electrodes in a touch region excluding the fingerprint recognizing region, and such a difference may be corrected (compensated for) by a circuitry method. When it is pre-determined that an output value at the same location, i.e., from the fingerprint recognizing region, will increase, linearity compensation of a touch may be easily performed by a circuitry method. In other words, by decreasing the output value or adjusting a gain value in a circuitry method, the output value from the fingerprint recognizing region may be adjusted to be identical to that from the touch region. Because a size of the fingerprint recognizing region is small, a circuit for the compensation (compensation circuit) may be easily configured.

An arrangement structure of electrodes described above with reference to FIGS. 13 through 15 may be applied to the touch-fingerprint complex sensor having various electrode configurations described above with reference to FIGS. 10 through 12. According to an example embodiment, a touch-fingerprint complex sensor having an area equal to or larger than about 5 inches or about 7 inches may be easily manufactured by increasing an interval between two electrodes at an intersection of the two electrodes in a touch region. When a transparent electrode structure as in FIG. 10 is used, a touch-fingerprint complex sensor having an area equal to or larger than about 5 inches may be manufactured, and when a hybrid electrode structure as in FIG. 11 is used, a touch-fingerprint complex sensor having an area equal to or larger than about 7 inches may be manufactured. However, this is only an example, and a realizable area of a touch-fingerprint complex sensor may vary based on the thickness of an insulating layer between electrodes or an arrangement structure of the electrodes. When the transparent electrode structure or the hybrid electrode structure is used, an on-screen touch-fingerprint complex sensor having high transmittance may be realized compared to when a metal mesh electrode structure is used.

In addition, according to an example embodiment, in relation to using a step adjusting layer, a height of a pad portion for interconnection may be easily adjusted. In other words, with respect to forming a first pad portion connected to at least one first electrode and a second pad portion connected to at least one second electrode, the heights of the first and second pad portions may be easily adjusted in relation to using a step adjusting layer. Accordingly, a sensor having high reliability may be manufactured without having to add a separate capping layer.

Figure 16:
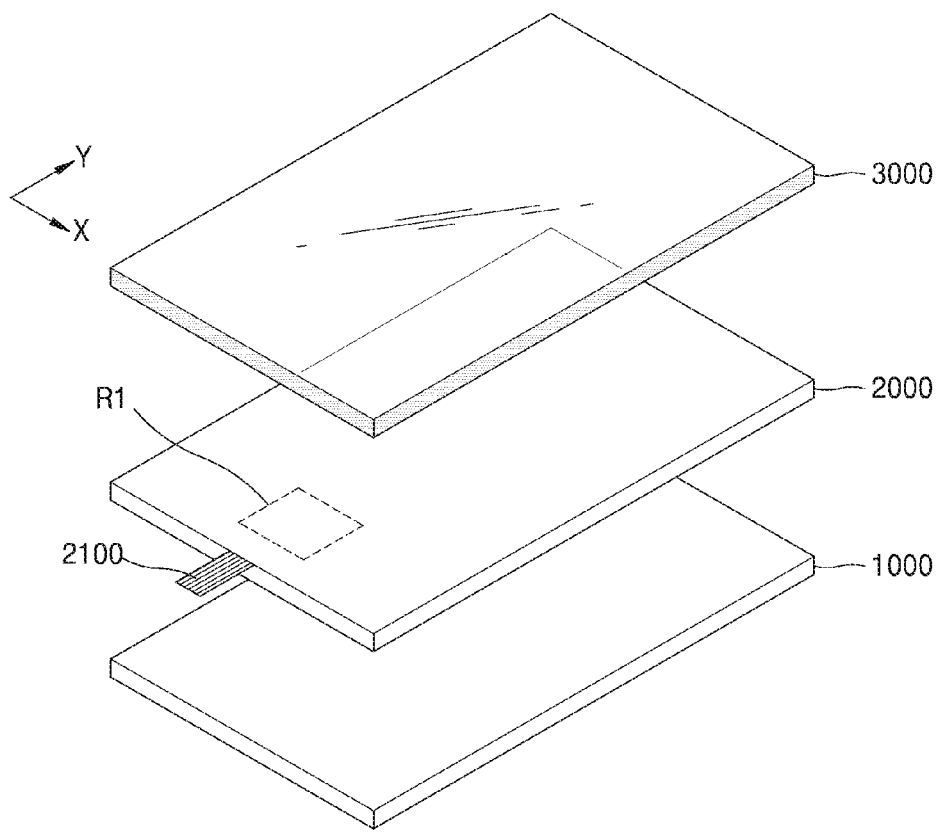
FIG. 16 is an exploded perspective view for describing an electronic apparatus including a touch-fingerprint complex sensor, according to an example embodiment.

FIG. 16 is an exploded perspective view for describing an electronic apparatus including a touch-fingerprint complex sensor 2000, according to an example embodiment.

Referring to FIG. 16, a display panel 1000 may be provided, and the touch-fingerprint complex sensor 2000 may be provided on the display panel 1000. The display panel 1000 may be, for example, a liquid crystal display (LCD), but is not limited thereto and may vary. Any one of various display devices, such as an organic light-emitting diode (OLED) panel, may be applied to the display panel 1000.

The touch-fingerprint complex sensor 2000 may include a fingerprint recognizing region R1. A connector 2100 may extend from the touch-fingerprint complex sensor 2000. The connector 2100 may include a plurality of wires. The connector 2100 may be connected to a circuit unit. The circuit unit may include a detection circuit and the compensation circuit described above. The touch-fingerprint complex sensor 2000 may include a plurality of first electrodes and a plurality of second electrodes crossing the plurality of first electrodes. Mutual capacitance may be formed between the plurality of first electrodes and the plurality of second electrodes. An insulating layer may be provided between the plurality of first electrodes and the plurality of second electrodes. The insulating layer may be transparent. The touch-fingerprint complex sensor 2000 may be formed on a sub-substrate.

A transparent film 3000 may be provided to cover the touch-fingerprint complex sensor 2000. The transparent film 3000 may be formed of a transparent insulating material, such as glass.

A touch-fingerprint complex sensor according to various embodiments may be applied to any electronic apparatus including an existing touch display. The touch-fingerprint complex sensor is an on-screen capacitance type device, and may be applied to a fingerprint recognizable touch screen apparatus. For example, the touch-fingerprint complex sensor may be applied to a mobile device, such as a smart watch, a smart phone, or a tablet personal computer (PC), or a wearable device. Also, the touch-fingerprint complex sensor may be applied to various flexible devices and foldable devices. Also, the touch-fingerprint complex sensor may be applied to any one of various electronic devices, such as a home appliance, an automatic teller machine (ATM), an automatic ticketing machine, and a navigation device. The touch-fingerprint complex sensor may be applied to a mobile device, an access control system, or a financial device, which use personal authentication through fingerprint recognition, in various manners.

The example embodiments described herein may be considered in a descriptive sense only and not for purposes of limitation. For example, it would be obvious to one of ordinary skill in the art that a touch-fingerprint complex sensor, an electronic apparatus including the touch-fingerprint complex sensor, and an operating method of the touch-fingerprint complex sensor described above with reference to FIGS. 1 through 16 may be variously modified. For example, a distance (interval) between electrodes or capacitance between electrodes may be selectively adjusted without a separate step adjusting layer, and when the step adjusting layer is used, a shape, pattern, location, size, thickness of the step adjusting layer may vary according to regions. Also, a pattern, size, or the like of a step adjusting layer may be adjusted in a touch region instead of a fingerprint recognizing region to differently adjust a distance between electrodes or capacitance between electrodes in a plurality of different regions in the touch region. While example embodiments have been described with reference to the figures, it will be understood by those of ordinary skill in the art that various changes in form and details may be made therein without departing from the spirit and scope as defined by the following claims.

What is claimed is:

1. A touch-fingerprint complex sensor for detecting a touch and a fingerprint of a user, using a touch pad including a touch region in which the touch is detected and a fingerprint recognizing region in which the fingerprint is detected, the touch-fingerprint complex sensor comprising:
   a plurality of first electrodes provided on a substrate, and arranged in parallel in a first direction;
   a plurality of second electrodes provided on the substrate, and arranged in parallel in a second direction crossing the first direction; and
   an insulating layer provided between the plurality of first electrodes and the plurality of second electrodes,
   wherein a cross-sectional distance between the plurality of first electrodes and the plurality of second electrodes at intersections of the plurality of first electrodes and the plurality of second electrodes in the touch region excluding the fingerprint recognizing region is greater than a cross-sectional distance between the plurality of first electrodes and the plurality of second electrodes at intersections of the plurality of first electrodes and the plurality of second electrodes in the fingerprint recognizing region, and
wherein a first portion of each of the plurality of first electrodes or the plurality of second electrodes is provided on the substrate, and a second portion of the each of the plurality of first electrodes or the plurality of second electrodes is provided on a step adjusting layer, which is provided on the substrate.

2. The touch-fingerprint complex sensor of claim 1, wherein a height difference between the plurality of first electrodes and the plurality of second electrodes at the intersections in the touch region excluding the fingerprint recognizing region is greater than a height difference between the plurality of first electrodes and the plurality of second electrodes at non-intersections around the intersections in the touch region.

3. The touch-fingerprint complex sensor of claim 1, wherein a height difference between the plurality of first electrodes and the plurality of second electrodes at non-intersections around the intersections in the touch region excluding the fingerprint recognizing region is substantially same as a height difference between the plurality of first electrodes and the plurality of second electrodes at the intersections in the fingerprint recognizing region.

4. The touch-fingerprint complex sensor of claim 1, wherein a mutual capacitance at the intersections in the touch region excluding the fingerprint recognizing region is less than a mutual capacitance at the intersections in the fingerprint recognizing region.

5. The touch-fingerprint complex sensor of claim 1, further comprising the step adjusting layer provided separately from the substrate or provided as a part of the substrate,
wherein the cross-sectional distance between the plurality of first electrodes and the plurality of second electrodes at the intersections in the touch region excluding the fingerprint recognizing region is greater than the cross-sectional distance between the plurality of first electrodes and the plurality of second electrodes at the intersections in the fingerprint recognizing region, based on a shape and a dimension of the step adjusting layer.

6. The touch-fingerprint complex sensor of claim 5, wherein the step adjusting layer comprises a plurality of via holes, and
wherein the plurality of via holes is provided at locations corresponding to the intersections in the touch region excluding the fingerprint recognizing region.

7. The touch-fingerprint complex sensor of claim 6, wherein each of the plurality of via holes has a diameter or a width less than or equal to 100 μm.

8. The touch-fingerprint complex sensor of claim 6, wherein the step adjusting layer is provided separately from the substrate, and disposed on the substrate,
wherein the plurality of first electrodes is provided on the substrate and the step adjusting layer,
wherein the insulating layer covers the step adjusting layer and the plurality of first electrodes, and
wherein the plurality of second electrodes is provided on the insulating layer.

9. The touch-fingerprint complex sensor of claim 5, wherein the step adjusting layer comprises a plurality of island pattern layers, and
wherein the plurality of island pattern layers is provided at locations corresponding to the intersections in the touch region excluding the fingerprint recognizing region.

10. The touch-fingerprint complex sensor of claim 9, wherein the plurality of first electrodes and first parts of the plurality of second electrodes are provided on a first level, and
wherein second parts of the plurality of second electrodes are provided on a second level different from the first level.

11. The touch-fingerprint complex sensor of claim 9, wherein the plurality of first electrodes and first parts of the plurality of second electrodes are provided on the substrate,
wherein the insulating layer is provided on the substrate, the plurality of first electrodes, and the first parts of the plurality of second electrodes, and comprises a plurality of openings respectively exposing portions of the first parts of the plurality of second electrodes,
wherein the step adjusting layer is provided on a portion of the insulating layer in the touch region excluding the fingerprint recognizing region,
wherein second parts of the plurality of second electrodes are provided on the insulating layer and the step adjusting layer, and
wherein each of the second parts of the plurality of second electrodes extends in the second direction and has a bridge structure of connecting the first parts of the plurality of second electrodes by being respectively connected to the first parts of the plurality of second electrodes through the plurality of openings.

12. The touch-fingerprint complex sensor of claim 11, wherein one of the plurality of openings is provided for each of the first parts of the plurality of second electrodes.

13. The touch-fingerprint complex sensor of claim 11, wherein two of the plurality of openings are provided for each of the first parts of the plurality of second electrodes, and
wherein a center portion of a respective one of the first parts of the plurality of second electrodes is provided between each two of the plurality of openings.

14. The touch-fingerprint complex sensor of claim 1, wherein the insulating layer comprises an organic material.

15. The touch-fingerprint complex sensor of claim 1, wherein each of the plurality of first electrodes and the plurality of second electrodes comprises a plurality of rhombus shape pattern portions and a connecting portion provided between the plurality of rhombus shape pattern portions.

16. The touch-fingerprint complex sensor of claim 1, wherein one of the plurality of first electrodes and the plurality of second electrodes comprises a plurality of rhombus shape pattern portions and a connecting portion provided between the plurality of rhombus shape pattern portions, and another one of the plurality of first electrodes and the plurality of second electrodes comprises a plurality of electrode lines, or
each of the plurality of first electrodes and the plurality of second electrodes comprises the plurality of electrode lines.

17. The touch-fingerprint complex sensor of claim 1, wherein the plurality of first electrodes comprises a plurality of first touch electrodes and a plurality of first sub-electrodes provided between the plurality of first touch electrodes,
wherein the plurality of second electrodes comprises a plurality of second touch electrodes and a plurality of second sub-electrodes provided between the plurality of second touch electrodes, and wherein each of the plurality of first touch electrodes and the plurality of second touch electrodes is regularly arranged.

18. The touch-fingerprint complex sensor of claim 17, wherein at least two of the plurality of first touch electrodes are electrically-grouped as a first unit group, and wherein at least two of the plurality of second touch electrodes are electrically-grouped as a second unit group.

19. The touch-fingerprint complex sensor of claim 1, wherein the touch pad has a two-electrode structure.

20. The touch-fingerprint complex sensor of claim 1, wherein the plurality of first electrodes and the plurality of second electrodes are provided on one surface of the substrate.

21. An electronic apparatus comprising the touch-fingerprint complex sensor of claim 1.

22. The touch-fingerprint complex sensor of claim 1, wherein the plurality of first electrodes is directly provided on a first surface of the insulating layer, and the plurality of second electrodes is directly provided on a second surface of the insulating layer, and wherein the first surface has a plurality of protruding portions and the second surface is entirely flat.

23. A touch-fingerprint complex sensor for detecting a touch and a fingerprint of a user, using a touch pad including a touch region in which the touch is detected and a fingerprint recognizing region in which the fingerprint is detected, the touch-fingerprint complex sensor comprising:

a plurality of first electrodes provided on a substrate, and arranged in parallel in a first direction;

a plurality of second electrodes provided on the substrate, and arranged in parallel in a second direction crossing the first direction;

an insulating layer provided between the plurality of first electrodes and the plurality of second electrodes; and a step adjusting layer provided adjacent to the insulating layer, wherein a mutual capacitance at intersections of the plurality of first electrodes and the plurality of second electrodes in the fingerprint recognizing region and a mutual capacitance at intersections of the plurality of first electrodes and the plurality of second electrodes in the touch region excluding the fingerprint recognizing region are different based on the step adjusting layer, wherein the step adjusting layer comprises a plurality of via holes, and wherein the plurality of via holes is provided at locations corresponding to the intersections in the touch region excluding the fingerprint recognizing region.

24. The touch-fingerprint complex sensor of claim 23, wherein the mutual capacitance at the intersections in the touch region excluding the fingerprint recognizing region is less than the mutual capacitance at the intersections in the fingerprint recognizing region.

25. The touch-fingerprint complex sensor of claim 23, wherein a cross-sectional distance between the plurality of first electrodes and the plurality of second electrodes at the intersections in the touch region excluding the fingerprint recognizing region is greater than a cross-sectional distance between the plurality of first electrodes and the plurality of second electrodes at the intersections in the fingerprint recognizing region.

26. The touch-fingerprint complex sensor of claim 23, wherein a height difference between the plurality of first electrodes and the plurality of second electrodes at the intersections in the touch region excluding the fingerprint recognizing region is greater than a height difference between the plurality of first electrodes and the plurality of second electrodes at non-intersections around the intersections in the touch region.

27. The touch-fingerprint complex sensor of claim 23, wherein a height difference between the plurality of first electrodes and the plurality of second electrodes at non-intersections around the intersections in the touch region excluding the fingerprint recognizing region is substantially same as a height difference between the plurality of first electrodes and the plurality of second electrodes at the intersections in the fingerprint recognizing region.

28. An electronic apparatus comprising the touch-fingerprint complex sensor of claim 23.

29. A touch-fingerprint complex sensor for detecting a touch and a fingerprint of a user, using a touch pad including a touch region in which the touch is detected and a fingerprint recognizing region in which the fingerprint is detected, the touch-fingerprint complex sensor comprising:

a plurality of first electrodes provided on a substrate, and arranged in parallel in a first direction;

a plurality of second electrodes provided on the substrate, and arranged in parallel in a second direction crossing the first direction;

an insulating layer provided between the plurality of first electrodes and the plurality of second electrodes; and a step adjusting layer provided adjacent to the insulating layer, wherein a mutual capacitance at intersections of the plurality of first electrodes and the plurality of second electrodes in the fingerprint recognizing region and a mutual capacitance at intersections of the plurality of first electrodes and the plurality of second electrodes in the touch region excluding the fingerprint recognizing region are different based on the step adjusting layer, wherein the step adjusting layer comprises a plurality of island pattern layers, and wherein the plurality of island pattern layers is provided at locations corresponding to the intersections in the touch region excluding the fingerprint recognizing region.

30. The touch-fingerprint complex sensor of claim 29, wherein the plurality of first electrodes and first parts of the plurality of second electrodes are provided on a first level, and wherein second parts of the plurality of second electrodes are provided on a second level different from the first level.

* * * * *